(12) United States Patent
Hirao et al.

(10) Patent No.: US 10,922,129 B2
(45) Date of Patent: Feb. 16, 2021

(54) OPERATION PROCESSING DEVICE AND CONTROL METHOD OF OPERATION PROCESSING DEVICE

(71) Applicant: FUJITSU LIMITED, Kawasaki (JP)

(72) Inventors: Seiji Hirao, Kawasaki (JP); Sota Sakashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 16/014,268

(22) Filed: Jun. 21, 2018

(65) Prior Publication Data
US 2019/0004855 A1 Jan. 3, 2019

(30) Foreign Application Priority Data

Jun. 28, 2017 (JP) ................................ 2017-126750

(51) Int. Cl.
*G06F 9/38* (2018.01)
*G06F 9/48* (2006.01)
*G06F 13/16* (2006.01)
*G06F 9/50* (2006.01)

(52) U.S. Cl.
CPC .......... *G06F 9/4837* (2013.01); *G06F 9/5038* (2013.01); *G06F 13/1689* (2013.01)

(58) Field of Classification Search
None
See application file for complete search history.

(56) References Cited

U.S. PATENT DOCUMENTS

| 4,644,466 A * | 2/1987 | Saito .................... G06F 9/3889 712/218 |
| 5,892,696 A * | 4/1999 | Kozu .................... G06F 9/3001 708/490 |
| 6,345,354 B1 * | 2/2002 | Radivojevic ........ G06F 9/30141 711/123 |

(Continued)

FOREIGN PATENT DOCUMENTS

| EP | 0 543 415 A2 | 5/1993 |
| JP | 5-143328 | 6/1993 |
| JP | 5-165639 | 7/1993 |

OTHER PUBLICATIONS

Japanese Patent Office English Abstract for Japanese Patent Publication No. 5-143328 published Jun. 11, 1993.
(Continued)

*Primary Examiner* — John M Lindlof
(74) *Attorney, Agent, or Firm* — Staas & Halsey, LLP

(57) ABSTRACT

An operation processing device includes a first register unit including first registers configured to hold data to be used for an operation in an operation unit; a first selection unit that selects data held by a first register indicated by a read address signal; a second selection unit that selects, based on a bypass selection signal, data from a data group including the data selected by the first selection unit and data indicative of a result of the operation; a second register unit that outputs the data selected by the second selection unit to the operation unit; a timing adjustment unit that outputs the read address signal to the first selection unit; and a bypass control unit that stops an operation of the timing adjustment unit when generating the bypass selection signal indicative of a selection of data other than the data selected by the first selection unit.

10 Claims, 16 Drawing Sheets

| COMPARISON RESULT | CMP1 | CMP2 | CMP3 | CMP4 | CMP0 | SELp | BYPASS ROUTE | TYPE OF DEPENDENCE |
|---|---|---|---|---|---|---|---|---|
| RAp=WAsx3 | 1 | 0 | 0 | 0 | 0 | 0x1 | BYPASS FROM OPERATION UNIT | RAW AND SHORTEST |
| RAp=WAsx4 | 0 | 1 | 0 | 0 | 0 | 0x2 | BYPASS FROM RESULT REGISTER | RAW AND ONE INSTRUCTION AFTER |
| RAp=RAsb | 0 | 0 | 1 | 0 | 0 | 0x3 | BYPASS FROM OPERAND REGISTER | RAR AND SHORTEST |
| RAp=RAsx1 | 0 | 0 | 0 | 1 | 0 | 0x4 | BYPASS FROM OPERAND LATCH | RAR AND ONE INSTRUCTION AFTER |
| NOT MATCH | 0 | 0 | 0 | 0 | 1 | 0x0 | READ FROM REGISTER FILE WITHOUT BYPASS | NO DEPENDENCE |

(56) References Cited

U.S. PATENT DOCUMENTS

| | | | | |
|---|---|---|---|---|
| 6,615,340 B1* | 9/2003 | Wilmot, II | ............ | G06F 9/3004 |
| | | | | 712/209 |
| 2005/0038980 A1* | 2/2005 | Rodgers | .............. | G06F 9/30152 |
| | | | | 712/220 |

OTHER PUBLICATIONS

Japanese Patent Office English Abstract for Japanese Patent Publication No. 5-165639 published Jul. 2, 1993.

* cited by examiner

FIG.6

| COMPARISON RESULT | CMP1 | CMP2 | CMP3 | CMP4 | CMP0 | SELp | BYPASS ROUTE | TYPE OF DEPENDENCE |
|---|---|---|---|---|---|---|---|---|
| RAp=WAsx3 | 1 | 0 | 0 | 0 | 0 | 0x1 | BYPASS FROM OPERATION UNIT | RAW AND SHORTEST |
| RAp=WAsx4 | 0 | 1 | 0 | 0 | 0 | 0x2 | BYPASS FROM RESULT REGISTER | RAW AND ONE INSTRUCTION AFTER |
| RAp=RAsb | 0 | 0 | 1 | 0 | 0 | 0x3 | BYPASS FROM OPERAND REGISTER | RAR AND SHORTEST |
| RAp=RAsx1 | 0 | 0 | 0 | 1 | 0 | 0x4 | BYPASS FROM OPERAND LATCH | RAR AND ONE INSTRUCTION AFTER |
| NOT MATCH | 0 | 0 | 0 | 0 | 1 | 0x0 | READ FROM REGISTER FILE WITHOUT BYPASS | NO DEPENDENCE |

OPERATION PROCESSING DEVICE AND CONTROL METHOD OF OPERATION PROCESSING DEVICE

CROSS-REFERENCE TO RELATED APPLICATION

This application is based upon and claims the benefit of priority of the prior Japanese Patent Application No. 2017-126750 filed on Jun. 28, 2017, the entire contents of which are incorporated herein by reference.

FIELD

The embodiments discussed herein relate to an operation processing device and a control method of an operation processing device.

BACKGROUND

An operation processing device such as a CPU (Central Processing Unit) includes an operation unit that executes an operation, a register file that holds data to be used for the operation in the operation unit, and an operand register that holds data transferred from the register file, etc. This type of an operation processing device executes a plurality of instructions in parallel by executing the instructions by a pipeline process using a pipeline including a plurality of stages. For example, the plurality of stages are stages such as a stage for receiving an instruction, a stage for decoding the instruction, a stage for executing an operation using data transferred from the register file to the operand register, and a stage for writing an operation result in the register file.

For example, Patent Documents 1 and 2 disclose an operation processing device that executes, when a subsequent instruction among two consecutive instructions uses an operation result of a preceding instruction, a bypass transfer of transferring the operation result of the preceding instruction to an operand register without passing through a register file. This type of an operation processing device executes the operation of the subsequent instruction by executing the bypass transfer and using the operation result of the preceding instruction without waiting for the operation result of the preceding instruction to be written in the register file. In this case, the performance of the operation processing device is improved as compared with a case where bypass transfer is not executed.

RELATED-ART DOCUMENTS

Patent Documents

[Patent Document 1] Japanese Laid-open Patent Publication No. 05-143328
[Patent Document 2] Japanese Laid-open Patent Publication No. 05-165639

When an operation processing device includes a CMOS (Complementary Metal Oxide Semiconductor) circuit such as a NOT gate (inverter), a NAND gate, or a NOR gate, in the CMOS circuit, a through current flows between a power supply line and a ground line during a transition period in which the level of an input signal is switched. For example, in a case where data to be transferred from a register file to an operand register is selected based on an address signal indicative of the storage destination of the data in the register file, every time the address signal changes, a through current flows in the CMOS circuit to which the address signal is transmitted. As the through current increases, the power consumption of the operation processing device increases. For example, it is possible to reduce the power consumption of the operation processing device by reducing the through current in a circuit such as a circuit for selecting data to be transferred from the register file to the operand register.

SUMMARY

According to an aspect of the embodiments, an operation processing device includes an operation unit configured to execute an operation; a first register unit; a first selection unit; a second selection unit; a second register unit; a timing adjustment unit; and a bypass control unit. The first register unit includes a plurality of first registers configured to hold data to be used for the operation in the operation unit. The first selection unit receives a read address signal and selects data held by a first register, indicated by the read address signal, among the plurality of first registers. The second selection unit selects, based on a bypass selection signal, data from a data group including the data selected by the first selection unit and data indicative of a result of the operation executed by the operation unit. The second register unit holds the data selected by the second selection unit and outputs the held data to the operation unit. The timing adjustment unit outputs the read address signal to the first selection unit. The bypass control unit generates the bypass selection signal based on the read address signal, and when generating the bypass selection signal indicative of a selection of data other than the data selected by the first selection unit from the data group, stops an operation of the timing adjustment unit.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 6 is a diagram illustrating an example of an operation of a selection signal generation unit that is illustrated in FIG. 5;

DESCRIPTION OF EMBODIMENT

In the following, embodiments will be described with reference to the drawings. According to an aspect of the embodiments, an object is to reduce power consumption of an operation processing device.

Figure 1:
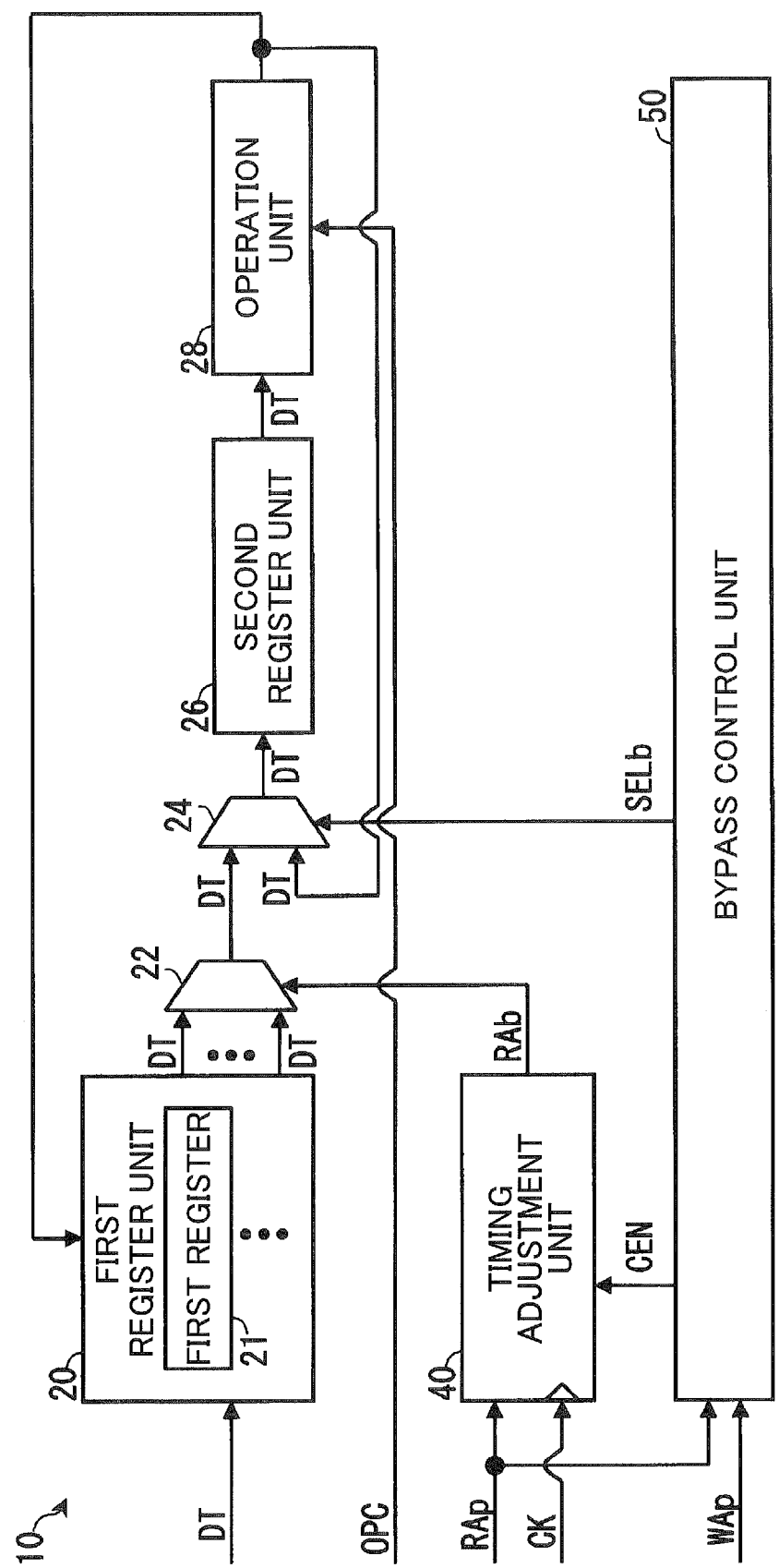
FIG. 1 is a diagram illustrating an embodiment of an operation processing device and a control method of the operation processing device.

FIG. 1 illustrates an embodiment of an operation processing device and a control method of the operation processing device. The operation processing device 10 illustrated in FIG. 1 is a processor such as a CPU, and is mounted in an information processing apparatus such as a server. For example, the operation processing device 10 executes a plurality of instructions in parallel by executing the instructions by a pipeline process using a pipeline including a plurality of stages. The operation processing device 10 includes a first register unit 20, a first selection unit 22, a second selection unit 24, a second register unit 26, an operation unit 28, a timing adjustment unit 40, and a bypass control unit 50.

The first register unit 20 is a register file or the like that includes a plurality of registers each of which stores a corresponding one of a plurality of sets of data, and includes a plurality of first registers 21 that hold data DT to be used for an operation in the operation unit 28. For example, the first register unit 20 receives data DT to be used for the operation in the operation unit 28 from a cache memory such as a data cache (not illustrated), and stores the received data DT in one of the plurality of first registers 21. In addition, the first register unit 20 stores, in one of the plurality of first registers 21, data DT indicative of the result of the operation by the operation unit 28.

The first selection unit 22 receives, from the timing adjustment unit 40, a read address signal RAb indicative of a first register 21 storing data DT to be read from the first register unit 20. Then, the first selection unit 22 selects the data DT held by the first register 21, indicated by the read address signal RAb, among the plurality of first registers 21, and transfers the selected data DT to the second selection unit 24.

The second selection unit 24 receives the data DT selected by the first selection unit 22 and the data DT indicative of a result of an operation executed by the operation unit 28. Furthermore, the second selection unit 24 receives a bypass selection signal SELb from the bypass control unit 50. Note that the bypass selection signal SELb is a selection signal for selecting, from a data group including the data DT selected by the first selection unit 22 and the data DT indicative of the result of the operation executed by the operation unit 28, data DT to be used for an operation in the operation unit 28. The second selection unit 24 selects, based on the bypass selection signal SELb, either the data DT selected by the first selection unit 22 or the data DT indicative of the result of the operation executed by the operation unit 28, and transfers the selected data DT to the second register unit 26.

For example, when the subsequent instruction among two consecutive instructions uses an operation result of the preceding instruction, the second selection unit 24 selects the data DT indicative of the result of the operation executed by the operation unit 28 based on the bypass selection signal SELb. Then, the second selection unit 24 transfers the data DT (operation result of the operation unit 28) selected based on the bypass selection signal SELb to the second register unit 26. In this case, the data DT to be used for the operation of the subsequent instruction is transferred to the second register unit 26 without passing through the first register unit 20. In the following, a process in which data DT to be used for an operation is transferred to the second register unit 26 without passing through the first register unit 20 may also be referred to as a bypass transfer.

As described above, the second selection unit 24 selects, based on the bypass selection signal SELb, data DT from the data group including the data DT selected by the first selection unit 22 and the data DT indicative of the result of the operation executed by the operation unit 28.

The second register unit 26 is an operand register or the like that holds the operand(s) of an operation to be executed by the operation unit 28. The second register unit 26 holds the data DT selected by the second selection unit 24 and outputs the held data DT to the operation unit 28.

The operation unit 28 receives the data DT such as the operand(s) of an instruction from the second register unit 26 and receives an operation code OPC indicative of a content of the instruction from an input unit such as a reservation station. Then, the operation unit 28 executes the operation indicated by the operation code OPC by using the data DT received from the second register unit 26, and outputs the data DT indicative of the operation result to the second selection unit 24 and the first register unit 20.

The timing adjustment unit 40 outputs a read address signal RAb to the first selection unit 22. For example, the timing adjustment unit 40 receives the read address signal RAp indicative of a storage destination (one of the plurality of first registers 21) of the data DT, to be used for the operation in the first register unit 20 and a clock signal CK. Then, the timing adjustment unit 40 outputs the read address signal RAp as the read address signal RAb to the first selection unit 22 in synchronization with the clock signal CK. In FIG. 1, in order to make the figure easy to see, clock signals CK transferred to units other than the timing adjustment unit 40 are omitted.

The bypass control unit 50 receives a write address signal WAp indicative of a first register 21 in which data DT indicative of the result of the operation in the operation unit 28 is to be stored and receives the read address signal RAp. Then, the bypass control unit 50 generates a bypass selection signal SELb based on the read address signal RAp and the write address signal WAp, and outputs the generated bypass selection signal SELb to the second selection unit 24.

For example, when the read address signal RAp of the subsequent instruction among two consecutive instructions matches the write address signal WAp of the preceding instruction, the bypass control unit 50 generates a bypass selection signal SELb that selects data DT output from the operation unit 28. Thereby, the bypass transfer is executed.

When executing the bypass transfer, the bypass control unit 50 stops the operation of the timing adjustment unit 40. For example, when executing the bypass transfer, the bypass control unit 50 outputs, to the timing adjustment unit 40, a clock enable signal CEN indicative of stopping of the clock signal CK of the timing adjustment unit 40 to stop the clock signal CK of the timing adjustment unit 40. By stopping the clock signal CK of the timing adjustment unit 40, the operation of the timing adjustment unit 40 is stopped. The clock enable signal CEN is an example of a stop signal for stopping the operation of the timing adjustment unit 40.

As described above, when generating a bypass selection signal SELb indicative of a selection of data DT other than the data DT selected by the first selection unit 22 from the data group, the bypass control unit 50 stops the operation of the timing adjustment unit 40.

By stopping the operation of the timing adjustment unit 40, the read address signal RAb, which is supplied from the timing adjustment unit 40 to the first selection unit 22, does not change but maintains its value even when the read address signal RAp changes. That is, the transition of the address signal RAb to be supplied to the first selection unit 22 can be stopped. Thereby, it is possible to suppress a through current from flowing to a CMOS circuit such as a CMOS inverter in the first selection unit 22 or the like that operates each time the value of the address signal RAb is switched. As a result, it is possible to reduce the power consumption of the first selection unit 22 and the like, and to reduce the power consumption of the operation processing device 10.

Note that the configuration of the operation processing device 10 is not limited to the example that is illustrated in FIG. 1. For example, in addition to two sets of data DT, which are data DT selected by the first selection unit 22 and data DT indicative of an operation result of the operation unit 28, the second selection unit 24 may receive data DT output from the second register unit 26 to the operation unit 28. In this case, the second selection unit 24 selects, based on a bypass selection signal SELb, data DT from a data group including the data DT selected by the first selection unit 22, the data DT indicative of the operation result executed by the operation unit 28, and the data DT received from the second register unit 26.

Figure 2:
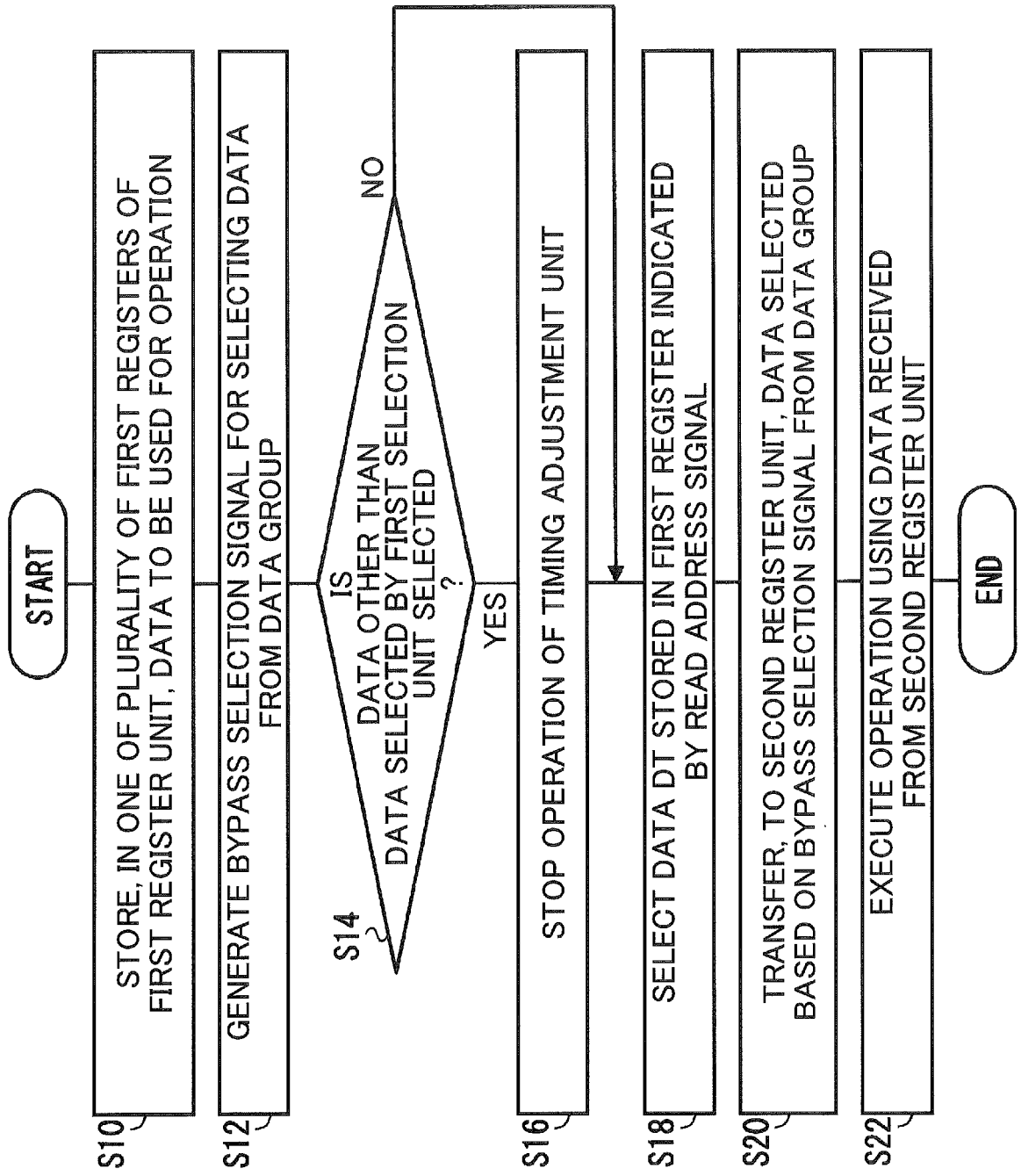
FIG. 2 is a diagram illustrating an example of an operation of the operation processing device that is illustrated in FIG. 1.

FIG. 2 illustrates an example of an operation of the operation processing device 10 that is illustrated in FIG. 1. The operation that is illustrated in FIG. 2 is one aspect of the control method of the operation processing device.

In step S10, the operation processing device 10 stores, in one of the plurality of first registers 21 included in the first register unit 20, data DT to be used for an operation. As a result, the one of the plurality of first registers 21 included in the first register unit 20 holds the data to be used for the operation.

Next, in step S12, the bypass control unit 50 generates a bypass selection signal SELb for selecting data DT from a data group based on a read address signal RAp and a write address signal WAp. As described with reference to FIG. 1, the data group includes the data DT selected by the first selection unit 22 and the data DT indicative of the result of the operation executed by the operation unit 28.

Next, in step S14, the bypass control unit 50 determines whether data DT other than the data DT selected by the first selection unit 22 is to be selected based on the bypass selection signal SELb. That is, the bypass control unit 50 determines whether the bypass transfer is to be executed. When data DT other than the data DT selected by the first selection unit 22 is to be selected based on the bypass selection signal SELb, that is, when the bypass transfer is to be executed, the operation of the operation processing device 10 proceeds to step S16. Conversely, when the data DT selected by the first selection unit 22 is to be selected based on the bypass selection signal SELb, that is, when the bypass transfer is not to be executed, the operation of the operation processing device 10 proceeds to step S18.

In step S16, the bypass control unit 50 stops the operation of the timing adjustment unit 40. For example, the bypass control unit 50 stops a clock signal CK of the timing adjustment unit 40. Thereby, as described with reference to FIG. 1, it is possible to stop the transition of the read address signal RAb supplied from the timing adjustment unit 40 to the first selection unit 22, and it is possible to reduce the power consumption of the first selection unit 22 and the like. As a result, it is possible to reduce the power consumption of the operation processing device 10.

In step S18, the first selection unit 22 selects the data DT held by a first register 21, indicated by the read address signal RAb, among the plurality of first registers 21 included in the first register unit 20. As described with reference to FIG. 1, the read address signal RAb is output from the timing adjustment unit 40 to the first selection unit 22. Therefore, when the operation of the timing adjustment unit 40 is stopped (when the process of step S16 is executed), there may be a case where the data DT1 held by the first register 21 indicated by the read address signal RAb does not match the data DT to be used for the operation.

Next, in step S20, the second selection unit 24 selects, based on the bypass selection signal SELb, data DT from the data group, and transfers, to the second register unit 26, the data DT selected based on the bypass selection signal SELb. Thereby, the second register unit 26 holds the data DT selected by the second selection unit 24. The data DT held by the second register unit 26 is output to the operation unit 28.

Note that when the operation of the timing adjustment unit 40 is stopped (when the process of step S16 is executed), among the data group, data DT other than the data DT1 selected by the first selection unit 22 is selected based on the bypass selection signal SELb.

Next, in step S22, the operation unit 28 executes the operation using the data DT received from the second register unit 26. The operation of the operation processing device 10 is not limited to the example that is illustrated in FIG. 2.

As described above, when transferring, to the second register unit 26 without passing through the first register unit 20, the data DT to be used for the operation, the bypass control unit 50 stops the operation of the timing adjustment unit 40. Thereby, it is possible to stop the transition of the address signal RAb, which is supplied from the timing adjustment unit 40 to the first selection unit 22, and it is possible to suppress a through current from flowing to a CMOS circuit included in the first selection unit 22 or the like. As a result, it is possible to reduce the power consumption of the first selection unit 22 and the like, and to reduce the power consumption of the operation processing device 10.

Figure 3:
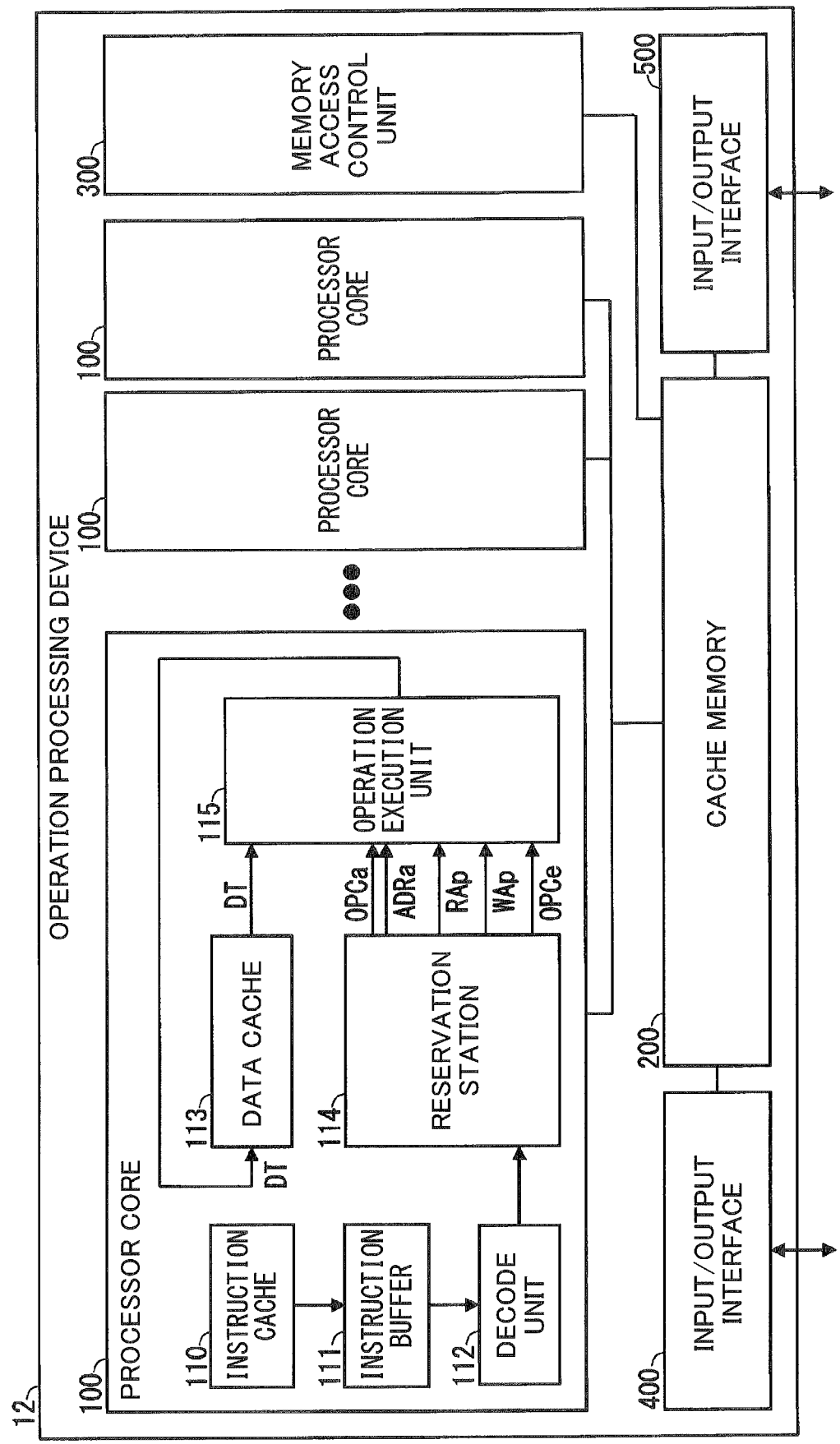
FIG. 3 is a diagram illustrating another embodiment of an operation processing device and a control method of the operation processing device.

FIG. 3 illustrates another embodiment of an operation processing device and a control method of the operation processing device. To elements the same as or similar to those described in FIG. 1, same or similar reference symbols are attached, and detailed description of those elements will be omitted. An operation processing device 12 illustrated in FIG. 3 is a processor such as a CPU, and is mounted in an information processing apparatus such as a server. For example, the operation processing device 12 executes a plurality of instructions in parallel by executing the instructions by a pipeline process using a pipeline including a plurality of stages. The operation processing device 12 includes a plurality of processor cores 100 such as CPU cores, a cache memory 200, a memory access control unit 300, and input/output interfaces 400 and 500.

Each of the processor cores 100 includes an instruction cache 110, an instruction buffer 111, a decode unit 112, a data cache 113, a reservation station 114, and an operation execution unit 115.

The instruction cache 110 is a primary cache memory that can be accessed faster than the cache memory 200, and holds instructions to be executed by the operation execution unit 115. The instruction buffer 111 sequentially receives instructions from the instruction cache 110 and sequentially transfers, to the decode unit 112, the instructions received from the instruction cache 110. The decode unit 112 decodes the instructions received from the instruction buffer 111, and outputs the decoded instructions to the reservation station 114. The data cache 113 is a primary cache memory that can be accessed faster than the cache memory 200, and holds data DT to be used in instructions executed by the operation execution unit 115.

The reservation station 114 performs out-of-order execution to input instructions to the operation execution unit 115. For example, the reservation station 114 accumulates the instructions decoded by the decode unit 112, and determines the dependence relationship of the accumulated instructions. Then, the reservation station 114 inputs the accumulated instructions to the operation execution unit 115 in order from executable instructions, based on the determination result of the dependency relationship. For example, the reservation station 114 outputs operation codes OPC (OPCa and OPCe) indicative of contents of instructions, and address signals ADRa, RAp, and WAp, etc. to the operation execution unit 115.

The operation code OPCa indicates an instruction for accessing a memory, and the operation code OPCe indicates an operation instruction for executing a floating point operation, a fixed point operation, or the like. The address signal ADRa is an address signal indicative of a storage destination of data that is accessed by the operation code OPCa. The address signal RAp is a read address signal indicative of a storage destination of data DT such as an operand of an operation to be executed by the operation execution unit 115. The address signal WAp is a write address signal indicative of a storage destination of data DT indicative of a result of an operation in the operation execution unit 115. The reservation station 114 is an example of an input unit that outputs the read address signal RAp and the write address signal WAp to a bypass control unit (for example, a bypass control unit 150 illustrated in FIG. 4).

The operation execution unit 115 executes, based on the operation code OPC received from the reservation station 114, an operation or the like by a pipeline process. Note that details of the operation execution unit 115 will be described with reference to FIG. 4.

The cache memory 200 is a secondary cache memory having a larger capacity than that of a primary cache memory such as the data cache 113. For example, the cache memory 200 can be accessed faster than a non-illustrated external memory (for example, a main storage device or the like) of the operation processing device 12, and holds part of data stored in the external memory. Note that in the example illustrated in FIG. 3, the cache memory 200 is shared by the plurality of processor cores 100.

The memory access control unit 300 is an interface that controls communication with an external memory (not illustrated) of the operation processing device 12. For example, the memory access control unit 300 controls communication with a memory such as a DIMM (Dual Inline Memory Module).

The input/output interface 400 is, for example, an interface in conformity with the PCI (Peripheral Component Interconnect) Express standard (hereinafter also referred to as PCIe). For example, the input/output interface 400 is coupled to an interface that is in conformity with PCIe in a host computer or a storage (not illustrated). The input/output interface 500 is an interface with another processing device (not illustrated), and is coupled to an input/output interface in said another processing device.

Note that the configuration of the operation processing device 12 is not limited to the example that is illustrated in FIG. 3. For example, the operation processing device 12 may include a plurality of cache memories 200 corresponding to the plurality of respective processor cores 100. Note that the operation processing device 12 may include an input unit that executes inputting instructions to the operation execution unit 115 in order, in place of the reservation station 114.

Figure 4:
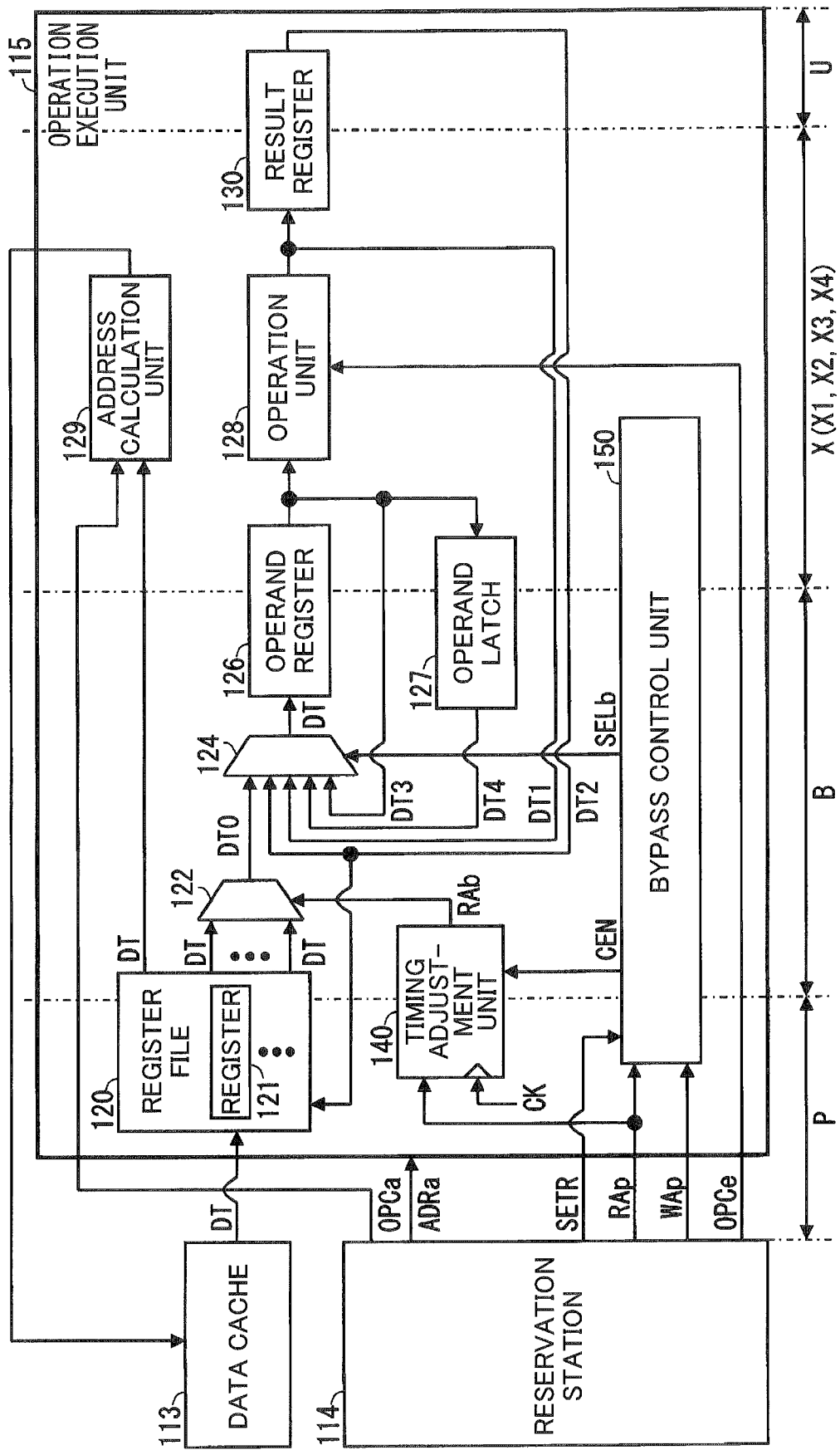
FIG. 4 is a diagram illustrating an example of an operation execution unit that is illustrated in FIG. 3.

FIG. 4 illustrates an example of the operation execution unit 115 that is illustrated in FIG. 3. The operation execution unit 115 includes a register file 120, a first selection unit 122, a second selection unit 124, an operand register 126, an operand latch 127, an operation unit 128, an address calculation unit 129, and a result register 130. Further, the operation execution unit 115 includes a timing adjustment unit 140 and the bypass control unit 150.

Note that a circuit group including the first selection unit 122, the second selection unit 124, the operand register 126, the operand latch 127, the timing adjustment unit 140, and a part of a circuit in the bypass control unit 150 is provided for each operand of an instruction executable by the operation unit 128. In FIG. 4, in order to make the figure easy to see, a circuit group corresponding to another operand including the first selection unit 122, the second selection unit 124, the operand register 126, the operand latch 127, the timing adjustment unit 140, etc. is omitted. Also, similarly to FIG. 4, in FIG. 4, in order to make the figure easy to see, clock signals CK transferred to units other than the timing adjustment unit 140 are omitted.

Further, in FIG. 4, in order to make the description easy to understand, a numeral is added to the end of a sign of data DT output from each of the first selection unit 122, the operation unit 128, the result register 130, the operand register 126, and the operand latch 127. For example, the numeral "0" is added to the end of the sign of the data DT selected by the first selection unit 122, and the numeral "1" is added to the end of the sign of the data DT output from the operation unit 128.

For example, the operation execution unit 115 executes a plurality of operations in parallel by executing the operations by a pipeline process using a pipeline including a plurality of stages. The dotted chain lines illustrated in FIG. 4 indicate the boundaries of the respective pipeline stages of the operation execution unit 115, and symbols P, B, X (X1, X2, X3, X4), and U indicate cycles of the respective pipeline stages. In the cycle P, an instruction is input to the operation execution unit 115. In the cycle B, data DT to be used in an operation is transferred from the register file 120 or the like to the operand register 126. In the cycle X (X1, X2, X3, X4), the operation unit 128 executes the operation based on the instruction. In the cycle U, data DT indicative of an operation result of the operation unit 128 is written in the register file 120. Hereinafter, the cycle P is also referred to as the P cycle, the cycle B is also referred to as the B cycle, the cycle X (X1, X2, X3, X4) is also referred to as the X (X1, X2, X3, X4) cycle, and the cycle U is also referred to as the U cycle. Note that the boundaries of the pipeline stages and the number of pipeline stages are not limited to the example that is illustrated in FIG. 4. In addition, in FIG. 4, in order to make the figure easy to see, a pipeline register or the like through which an operation code OPC or the like indicative of a content of an instruction reaches the operation unit 128 or the like is omitted.

The register file 120 includes a plurality of registers 121 that hold data DT to be used in the operation unit 128, the address calculation unit 129, and the like. For example, in the P cycle, the register file 120 receives data DT to be used for an operation and the like from the data cache 113, and stores the received data DT in one of the plurality of registers 121. The plurality of registers 121 are an example of a plurality of first registers that hold data DT to be used for an operation in the operation unit 128, and the register file 120 is an example of a first register unit including the plurality of first registers.

In the B cycle, the first selection unit 122 receives, from the timing adjustment unit 140, a read address signal RAb indicative of a register 121 storing data DT to be read from the register file 120. Then, the first selection unit 122 selects data DT0 held by the register 121, indicated by the read address signal RAb, among the plurality of registers 121, and transfers the selected data DT0 to the second selection unit 124.

In the B cycle, the second selection unit 124 receives the data DT0 from the first selection unit 122 and receives, from the operation unit 128, data DT1 indicative of a result of an operation executed by the operation unit 128. Further, the second selection unit 124 receives data DT2 from the result register 130, receives data DT3 from the operand register 126, and receives data DT4 from the operand latch 127. In addition, the second selection unit 124 receives a bypass selection signal SELb from the bypass control unit 150. Then, the second selection unit 124 selects data DT from a data group including the data DT0, the data DT1, the data DT2, the data DT3, and the data DT4 based on the bypass selection signal SELb, and transfers the selected data DT to the operand register 126.

The operand register 126 holds data DT such as an operand of an operation to be executed by the operation unit 128. For example, in the B cycle, the operand register 126 holds the data DT received from the second selection unit 124. That is, the operand register 126 holds the data DT selected by the second selection unit 124. Then, the operand register 126 outputs the data DT held in the B cycle to the second selection unit 124, the operand latch 127, and the operation unit 128 in the X1 cycle. The operand register 126 is an example of a second register unit that holds data DT selected by the second selection unit 124 and outputs the held data to the operation unit 128.

Note that for example, when data DT3 output from the operand register 126 to the second selection unit 124 and the operand latch 127 is to be used in an operation of the subsequent instruction among two instructions, the data DT3 is selected by the second selection unit 124. Thereby, in the subsequent instruction, a bypass transfer of the data DT3 or the like is executed.

The operand latch 127 holds the data DT3 received from the operand register 126. The operand latch 127 outputs the data DT3, received from the operand register 126, as data DT4 to the second selection unit 124 in the next cycle from the cycle in which the data DT3 has been received from the operand register 126. Note that the operand latch 127 is an example of a third register unit that holds data DT output from the second register unit (the operand register 126) to the operation unit 128 and outputs the held data DT to the second selection unit 124.

In the X cycle, the operation unit 128 receives an operation code OPCe indicative of a content of an instruction from the reservation station 114 via a pipeline register or the like (not illustrated) and receives data DT such as an operand of the instruction from the operand register 126. Then, for example, the operation unit 128 executes the operation indicated by the operation code OPCe by using the data DT received from the operand register 126, and outputs data DT1 indicative of the operation result to the result register 130 and the second selection unit 124. Note that for example, when the data DT1 output from the operation unit 128 to the second selection unit 124 is to be used in an operation of the subsequent instruction among two instructions, the data DT1 is selected by the second selection unit 124.

The address calculation unit 129 receives an operation code OPCa or the like indicative of an instruction to access the memory and calculates an address indicative of a storage destination of data DT to be accessed in the data cache 113. Then, the address calculation unit 129 stores, in the data cache 113, the data DT received from the register file 120. Note that in FIG. 4, in order to make the figure easy to see, a signal line through which the address signal ADRa is transferred is omitted.

The result register 130 holds the data DT1 output from the operation unit 128 as data DT indicative of the result of the operation executed by the operation unit 128. For example, in the X4 cycle, the result register 130 holds the data DT1 received from the operation unit 128. Then, the result register 130 outputs the data DT1, held in the X4 cycle, to the register file 120 and the second selection unit 124 as data DT2 in the U cycle.

Thereby, the data DT2 indicative of the result of the operation executed by the unit 128 is written, in the U cycle, in one of the plurality of registers 121 included in the register file 120. Further, for example, when the data DT2 output from the result register 130 to the second selection unit 124 is to be used in an operation of the subsequent instruction among two instructions, the data DT2 is selected by the second selection unit 124. The result register 130 is an example of a fourth register unit that outputs, to the first register unit (the register file 120) and the second selection unit 124, the data DT received from the operation unit 128.

The timing adjustment unit 140 is, for example, a flip-flop circuit or the like that operates in synchronization with a clock signal CK. The timing adjustment unit 140 receives the clock signal CK that is an operation clock signal for when executing a pipeline process, and operates in synchronization with the clock signal CK. For example, in the cycle P, the timing adjustment unit 140 receives, from the reservation station 114, a read address signal RAp indicative of a storage destination (one of the plurality of first registers 121) of data DT to be used for an operation. Then, in the B cycle, the timing adjustment unit 140 outputs the read address signal RAp as the read address signal RAb to the first selection unit 122 in synchronization with the clock signal CK.

In the P cycle, the bypass control unit 150 receives the read address signal RAp and a write address signal WAp from the reservation station 114. Then, the bypass control unit 150 generates a bypass selection signal SELb based on the read address signal RAp and the write address signal WAp, and outputs the generated bypass selection signal SELb to the second selection unit 124. Note that the write address signal WAp indicates a register 121 that stores data DT indicative of an operation result of the operation unit 128 among the plurality of registers 121 included in the register file 120.

When generating a bypass selection signal SELb indicative of a selection of data DT other than the data DT0 from the data group including the data DT0, the data DT1, the data DT2, the data DT3, and the data DT4, the bypass control unit 150 stops the clock signal of the timing adjustment unit 140. That is, when executing a bypass transfer of transferring data DT to be used for an operation to the operand register 126 without passing through the register file 120, the bypass control unit 150 stops the operation of the timing adjustment unit 140. For example, when executing the bypass transfer, the bypass control unit 150 outputs in the P cycle, to the timing adjustment unit 140, a clock enable signal CEN indicative of stopping the clock signal CK of the timing adjustment unit 140. Thereby, the clock signal CK of the timing adjustment unit 140 is stopped and the operation of the timing adjustment unit 140 is stopped. Thereby, the transition of the address signal RAb can be stopped.

Here, although the transition of the read address signal RAp is not stopped, the effect of not stopping the transition of the read address signal RAp is smaller than the effect of reducing the power consumption obtained by stopping the transition of the read address signal RAb. For example, the wiring for transmitting the read address signal RAp from the reservation station 114 to the timing adjustment unit 140 is wiring for one address indicative of a register 121 in the register file 120. Conversely, the wiring for transmitting the read address signal RAb from the timing adjustment unit 140 to the first selection unit 122 is wiring for distributing the read address signal RAb in accordance with a size of the register file 120. Therefore, the amount of wiring from the timing adjustment unit 140 to the first selection unit 122 increases as compared with the amount of wiring from the reservation station 114 to the timing adjustment unit 140.

Hence, electric power consumed by driving the wiring from the timing adjustment unit 140 to the first selection unit 122 is greater than electric power consumed by driving the wiring from the reservation station 114 to the timing adjustment unit 140. Therefore, by stopping driving the large amount of wiring from the timing adjustment unit 140 to the first selection unit 122, power consumption can be efficiently reduced.

Note that the configuration and the operation of the operation execution unit 115 is not limited to the example that is illustrated in FIG. 4. For example, the operand latch 127 may be a shift register including a plurality of stages for sequentially holding data DT3 received from the operand register 126. Alternatively, the operand latch 127 may be omitted. Also, for example, the result register 130 may be omitted.

Also, for example, the operation execution unit 115 may execute writing of the data DT1 indicative of the operation result in the register file 120 taking two or more cycles. Alternatively, the X cycle may be greater than or equal to one cycle and less than or equal to three cycles, or may be greater than or equal to 5 cycles or more. Also, when the data DT held in the operand register 126 or the like is used in another operand register (not illustrated), the operation execution unit 115 may bypass-transfer the data DT from the operand register 126 or the like to the another operand register.

Figure 5:
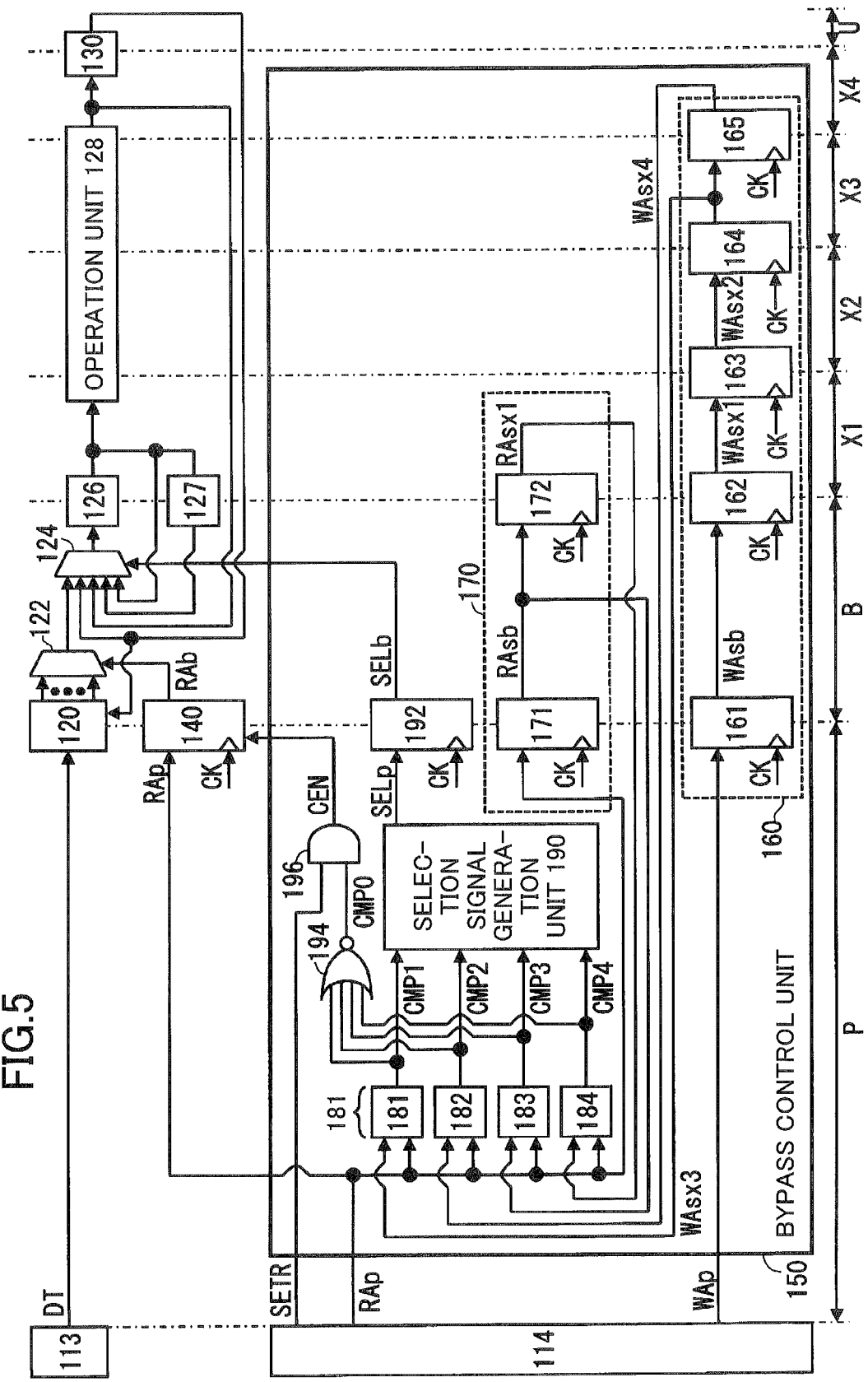
FIG. 5 is a diagram illustrating an example of a bypass control unit that is illustrated in FIG. 4.

FIG. 5 illustrates an example of the bypass control unit 150 that is illustrated in FIG. 4. As described with reference to FIG. 4, the dotted chain lines illustrated in FIG. 5 indicate the boundaries of the respective pipeline stages of the operation execution unit 115, and symbols P, B, X1, X2, X3, X4, and U indicate cycles of the respective pipeline stages.

The bypass control unit 150 includes shift registers 160 and 170, comparison units 181, 182, 183 and 184, a selection signal generation unit 190, a flip-flop circuit 192, a NOR circuit 194, and an AND circuit 196.

Note that a circuit group including the shift register 170 and the comparison units 181, 182, 183, and 184, the selection signal generation unit 190, the flip-flop circuit 192, the NOR circuit 194, and the AND circuit 196 is provided for each operand of an instruction executable by the operation unit 128. That is, the circuit group excluding the shift register 160 in the bypass control unit 150 illustrated in FIG. 5 is provided for each circuit group including the first selection unit 122, the second selection unit 124, the operand register 126, the operand latch 127, and the timing adjustment unit 140. In FIG. 5, in order to make the figure easy to see, a circuit group corresponding to another operand including the shift register 170, the comparison units 181, 182, 183, and 184, the selection signal generation unit 190, the flip-flop circuit 192, the NOR circuit 194, and the AND circuit 196 is omitted.

The shift register 160 is an example of a first shift register including a plurality of stages for sequentially holding write address signals WAp received from an input unit (the reservation station 114). For example, the shift register 160 includes flip-flop circuits 161, 162, 163, 164, and 165 that operate in synchronization with a clock signal CK.

In the P cycle, the flip-flop circuit 161 receives a write address signal WAp from the reservation station 114 and holds the received write address signal WAp. Then, the flip-flop circuit 161 outputs the write address signal WAp received from the reservation station 114 as a write address signal WAsb to the flip-flop circuit 162 in the B cycle.

In the B cycle, the flip-flop circuit 162 holds the write address signal WAsb received from the flip-flop circuit 161. Then, the flip-flop circuit 162 outputs the write address signal WAsb received from the flip-flop circuit 161 as a write address signal WAsx1 to the flip-flop circuit 163 in the X1 cycle.

In the X1 cycle, the flip-flop circuit 163 holds the write address signal WAsx1 received from the flip-flop circuit 162. Then, the flip-flop circuit 163 outputs the write address signal WAsx1 received from the flip-flop circuit 162 as a write address signal WAsx2 to the flip-flop circuit 164 in the X2 cycle.

In the X2 cycle, the flip-flop circuit 164 holds the write address signal WAsx2 received from the flip-flop circuit 163. Then, the flip-flop circuit 164 outputs the write address signal WAsx2 received from the flip-flop circuit 163 as a write address signal WAsx3 to the flip-flop circuit 165 and the comparison unit 181 in the X3 cycle.

In the X3 cycle, the flip-flop circuit 165 holds the write address signal WAsx3 received from the flip-flop circuit 164. Then, the flip-flop circuit 165 outputs the write address signal WAsx3 received from the flip-flop circuit 164 as a write address signal WAsx4 to the comparison unit 182 in the X4 cycle. In this way, the shift register 160 includes the plurality of flip-flop circuits 161, 162, 163, 164, and 165 that sequentially hold write address signals WAp received from the reservation station 114.

The shift register 170 is an example of a second shift register including a plurality of stages for sequentially holding read address signals RAp received from the input unit (the reservation station 114). For example, the shift register 170 includes flip-flop circuits 171 and 172 that operate in synchronization with a clock signal CK.

In the P cycle, the flip-flop circuit 171 receives a read address signal RAp from the reservation station 114 and holds the received read address signal RAp. Then, the flip-flop circuit 171 outputs the read address signal RAp received from the reservation station 114 as a read address signal RAsb to the flip-flop circuit 172 and the comparison unit 183 in the B cycle.

In the B cycle, the flip-flop circuit 172 holds the read address signal RAsb received from the flip-flop circuit 171. Then, the flip-flop circuit 172 outputs the read address signal RAsb received from the flip-flop circuit 171 as a read address signal RAsx1 in the X1 cycle to the comparison unit 184. In this way, the shift register 170 includes the plurality of flip-flop circuits 171 and 172 that sequentially hold read address signals RAp received from the reservation station 114.

In the P cycle, the comparison unit 181 receives the read address signal RAp from the reservation station 114. In addition, the comparison unit 181 receives the write address signal WAsx3 from the flip-flop circuit 164. The comparison unit 181 compares the read address signal RAp with the write address signal WAsx3, and outputs a signal CMP1 indicative of the comparison result to the selection signal generation unit 190 and the NOR circuit 194. For example, when the value of the read address signal RAp matches the value of the write address signal WAsx3, the comparison unit 181 outputs a signal CMP1 of logical 1 to the selection signal generation unit 190 and the NOR circuit 194. When the value of the read address signal RAp does not match the value of the write address signal WAsx3, the comparison unit 181 outputs a signal CMP1 of logical 0 to the selection signal generation unit 190 and the NOR circuit 194.

The comparison units 182, 183 and 184 are the same as or similar to the comparison unit 181, other than the signals to be compared with the read address signal RAp. For example, when the value of the read address signal RAp matches the value of the write address signal WAsx4, the comparison unit 182 outputs a signal CMP2 of logical 1 to the selection signal generation unit 190 and the NOR circuit 194.

When the value of the read address signal RAp matches the value of the read address signal RAsb, the comparison unit 183 outputs a signal CMP3 of logical 1 to the selection signal generation unit 190 and the NOR circuit 194. When the value of the read address signal RAp matches the value of the read address signal RAsx1, the comparison unit 184 outputs a signal CMP4 of logical 1 to the selection signal generation unit 190 and the NOR circuit 194.

The comparison units 181 and 182 are an example of a first comparison unit that compares the read address signal RAp with the write address signals (WAsx3 and WAsx4) held in the plurality of respective stages of the first shift register (the shift register 160). The comparison units 183 and 184 are an example of a second comparison unit that compares the read address signal RAp with read address signals (RAsb and RAsx1) held in the plurality of respective stages of the second shift register (the shift register 170).

The selection signal generation unit 190 is an example of a bypass selection signal generation unit that generates, based on a comparison result of the first comparison unit (the comparison units 181 and 182) and a comparison result of the second comparison unit (the comparison units 183 and 184), a bypass selection signal SELb to be output to the second selection unit 124. The selection signal generation unit 190 generates a bypass selection signal SELp based on the signals CMP1, CMP2, CMP3, and CMP4 respectively received from the comparison units 181, 182, 183, and 184. Then, the selection signal generation unit 190 outputs the bypass selection signal SELp generated based on the signals CMP1, CMP2, CMP3, and CMP4 to the flip-flop circuit 192. A relationship between the comparison results of the comparison units 181, 182, 183, and 184 and the bypass selection signal SELp will be described with reference to FIG. 6.

The flip-flop circuit 192 operates in synchronization with a clock signal CK. For example, the flip-flop circuit 192 holds the bypass selection signal SELp received from the selection signal generation unit 190. Then, in the next cycle from the cycle in which the bypass selection signal SELp has been received from the selection signal generation unit 190, the flip-flop circuit 192 outputs, as a bypass selection signal SELb, the bypass selection signal SELp to the second selection unit 124 in synchronization with the clock signal CK.

A circuit group including the NOR circuit 194 and the AND circuit 196 is an example of a stop signal generation unit that generates, based on a comparison result of the first comparison unit and a comparison result of the second comparison unit, a stop signal (clock enable signal CEN) to stop the operation of the timing adjustment unit 140.

The NOR circuit 194 performs (calculates) the NOR operation of four signals CMP1, CMP2, CMP3, and CMP4 respectively received from the comparison units 181, 182, 183, and 184, and outputs a signal CMP0 indicative of the operation result to the AND circuit 196. For example, when all the signals CMP1, CMP2, CMP3, and CMP4 are logical 0, the NOR circuit 194 outputs the signal CMP0 of logical 1 to the AND circuit 196. When at least one of the signals CMP1, CMP2, CMP3, and CMP4 is logical 1, the NOR circuit 194 outputs the signal CMP0 of logical 0 to the AND circuit 196.

The AND circuit 196 receives, from the reservation station 114, a signal SETR for setting data DT from the register file 120 to the operand register 126 and receives the signal CMP0 from the NOR circuit 194. Then, the AND circuit 196 operates (calculates) the logical conjunction of the signal SETR and the signal CMP0, and outputs the operation result as the clock enable signal CEN to the timing adjustment unit 140.

For example, when both the signal CMP0 and the signal SETR are logical 1, that is, when a bypass transfer is not to be executed in the subsequent instruction among two instructions, the clock enable signal CEN becomes logical 1. In this case, the transition of the read address signal RAb output from the timing adjustment unit 140 does not stop.

For example, when the signal CMP0 is logical 0, that is, when a bypass transfer is to be executed in the subsequent instruction among two instructions, the clock enable signal CEN becomes logical 0. By making the clock enable signal CEN logical 0, the clock signal CK in the timing adjustment unit 140 can be stopped, and the transition of the read address signal RAb output from the timing adjustment unit 140 can be stopped. As a result, it is possible to suppress a through current from flowing to a CMOS circuit to which the read address signal RAb is transferred (for example, a CMOS circuit included in the first selection unit 122 or the like), and to reduce the power consumption of the first selection unit 122 or the like. Further, because the operation of the timing adjustment unit 140 is stopped, it is possible to reduce the power consumption of the timing adjustment unit 140. As a result, it is possible to reduce the power consumption of the operation processing device 12.

Note that the configuration of the bypass control unit 150 is not limited to the example that is illustrated in FIG. 5. For example, the bypass control unit 150 may include, instead of the NOR circuit 194 and the AND circuit 196, a stop signal generation unit that generates a clock enable signal CEN from a bypass selection signal SELp output from the selection signal generation unit 190. Further, for example, in a case where the operand latch 127 includes a plurality of stages for sequentially holding data DT3, flip-flop circuits 172, comparison units 184, and the like included in the bypass control unit 150 may be added in accordance with the number of stages of the operand latch 127. Also, for example, in a case where a bypass route from the operand latch 127 is omitted, the flip-flop circuit 172 and the comparison unit 184 may be omitted. Also, for example, in a case where a bypass route from the operand register 126 and a bypass route from the operand latch 127 are omitted, the shift register 170 and the comparison units 183 and 184 may be omitted.

FIG. 6 illustrates an example of an operation of the selection signal generation unit 190 that is illustrated in FIG. 5. The read address signal RAp illustrated in FIG. 6 indicates an address signal input to the bypass control unit 150 by the subsequent instruction among two instructions. Also, the write address signals WAsx3 and WAsx4 and the read address signals RAsb and RAsx1 illustrated in FIG. 6 correspond to address signals input to the bypass control unit 150 by the preceding instruction among two instructions. Here, "0x1", "0x2", "0x3", "0x4", and "0x0" illustrated in FIG. 6 indicate hexadecimal values.

When the value of the read address signal RAp matches the value of the write address signal WAsx3, the selection signal generation unit 190 receives the signal CMP1 of logical 1 and the signals CMP2, CMP3, and CMP4 of logical 0. In this case, the selection signal generation unit 190 outputs a bypass selection signal SELp of "0x1" to the flip-flop circuit 192. The bypass selection signal SELp of "0x1" indicates a bypass from the operation unit 128. Note that when the value of the read address signal RAp matches the value of the write address signal WAsx3, two instructions have RAW (Read After Write) dependence in which the subsequent instruction reads the address after the operation result of the preceding instruction is written. The bypass from the operation unit 128 is the shortest bypass among bypasses for two instructions having RAW dependence.

When the value of the read address signal RAp matches the value of the write address signal WAsx4, the selection signal generation unit 190 receives the signal CMP2 of logical 1 and the signals CMP1, CMP3, and CMP4 of logical 0. In this case, the selection signal generation unit 190 outputs a bypass selection signal SELp of "0x2" to the flip-flop circuit 192. The bypass selection signal SELp of "0x2" indicates a bypass from the result register 130. Note that when the value of the read address signal RAp matches the value of the write address signal WAsx4, two instructions have RAW dependence. The bypass from the result register 130 is a bypass after one instruction from the shortest bypass among bypasses for two instructions having RAW dependence.

When the value of the read address signal RAp matches the value of the read address signal RAsb, the selection signal generation unit 190 receives the signal CMP3 of logical 1 and the signals CMP1, CMP2, and CMP4 of logical 0. In this case, the selection signal generation unit 190 outputs a bypass selection signal SELp of "0x3" to the flip-flop circuit 192. The bypass selection signal SELp of "0x3" indicates a bypass from the operand register 126. Note that when the value of the read address signal RAp matches the value of the read address signal RAsb, two instructions have RAR (Read After Read) dependence in which the subsequent instruction reads the address read by the preceding instruction. The bypass from the operand register 126 is the shortest bypass among bypasses for two instructions having RAR dependence.

When the value of the read address signal RAp matches the value of the read address signal RAsx1, the selection signal generation unit 190 receives the signal CMP4 of logical 1 and the signals CMP1, CMP2, and CMP3 of logical 0. In this case, the selection signal generation unit 190 outputs a bypass selection signal SELp of "0x4" to the flip-flop circuit 192. The bypass selection signal SELp of "0x4" indicates a bypass from the operand latch 127. Note that when the value of the read address signal RAp matches the value of the read address signal RAsx1, two instructions have RAR dependence. The bypass from the operand latch 127 is a bypass after one instruction from the shortest bypass among bypasses for two instructions having RAR dependence.

When none of the values of the write address signals WAsx3 and WAsx4 and the read address signals RAsb and RAsx1 match the value of the read address signal RAp, the selection signal generation unit 190 receives the signals CMP1, CMP2, CMP3, and CMP4 of logical 0. In this case, the selection signal generation unit 190 outputs a bypass selection signal SELp of "0x0" to the flip-flop circuit 192. The bypass selection signal SELp of "0x0" indicates that data DT is read out from the register file 120 without a bypass. When none of the values of the write address signals WAsx3 and WAsx4 and of the read address signals RAsb and RAsx1 match the value of the read address signal RAp, the two instructions have no dependence relationship.

Note that the operation of the selection signal generation unit 190 is not limited to the example that is illustrated in FIG. 6. For example, the selection signal generation unit 190 may transfer signals CMP1, CMP2, CMP3, and CMP4 to the flip-flop circuit 192 as 4-bit bypass selection signals SELp.

Figure 7:
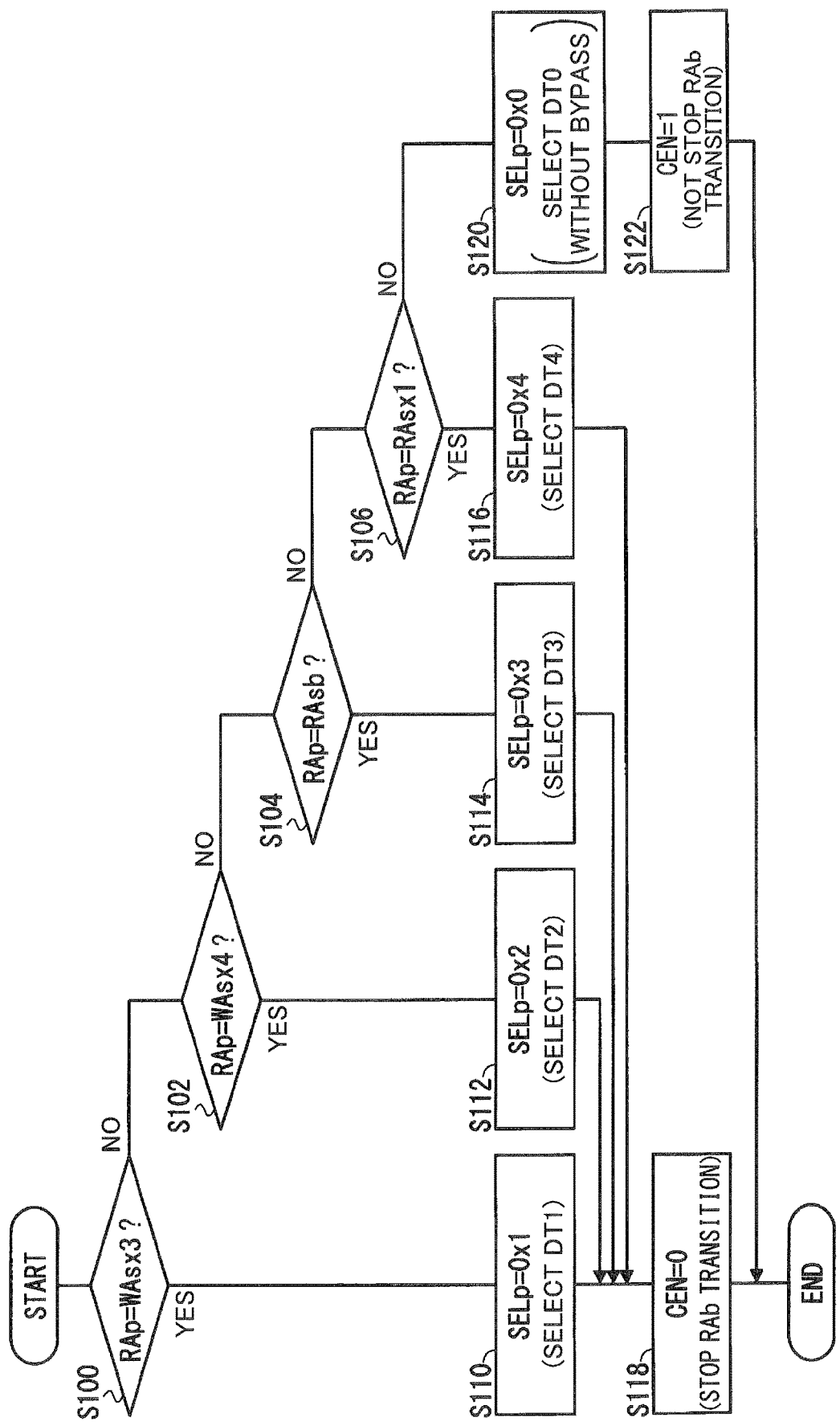
FIG. 7 is a diagram illustrating an example of an operation of a bypass control unit that is illustrated in FIG. 5.

FIG. 7 illustrates an example of an operation of the bypass control unit 150 that is illustrated in FIG. 5. Note that the operation that is illustrated in FIG. 7 is one aspect of the control method of the operation processing device. The meanings of the read address signals RAp, RAsb, and RAsx1 and the write address signals WAsx3 and WAsx4 illustrated in FIG. 7 are similar to those in FIG. 6.

In step S100, the comparison unit 181 determines whether the value of the read address signal RAp matches the value of the write address signal WAsx3. When the value of the read address signal RAp matches the value of the write address signal WAsx3, the operation of the bypass control unit 150 goes to step S110. Conversely, when the value of the read address signal RAp does not match the value of the write address signal WAsx3, the operation of the bypass control unit 150 goes to step S102.

In step S102, the comparison unit 182 determines whether the value of the read address signal RAp matches the value of the write address signal WAsx4. When the value of the read address signal RAp matches the value of the write address signal WAsx4, the operation of the bypass control unit 150 goes to step S112. Conversely, when the value of the read address signal RAp does not match the value of the write address signal WAsx4, the operation of the bypass control unit 150 goes to step S104.

In step S104, the comparison unit 183 determines whether the value of the read address signal RAp matches the value of the read address signal RAsb. When the value of the read address signal RAp matches the value of the read address signal RAsb, the operation of the bypass control unit 150 goes to step S114. Conversely, when the value of the read address signal RAp does not match the value of the read address signal RAsb, the operation of the bypass control unit 150 goes to step S106.

In step S106, the comparison unit 184 determines whether the value of the read address signal RAp matches the value of the read address signal RAsx1. When the value of the read address signal RAp matches the value of the read address signal RAsx1, the operation of the bypass control unit 150 goes to step S116. Conversely, when the value of the read address signal RAp does not match the value of the read address signal RAsx1, the operation of the bypass control unit 150 goes to step S120.

In step S110, the selection signal generation unit 190 outputs the bypass selection signal SELp of "0x1" to the flip-flop circuit 192. That is, when the value of the read address signal RAp matches the value of the write address signal WAsx3, the selection signal generation unit 190 outputs the bypass selection signal SELp of "0x1" to the flip-flop circuit 192. Thereby, the second selection unit 124 receives the bypass selecting signal SELb of "0x1" from the flip-flop circuit 192 and selects the data DT1 to be bypass-transferred from the operation unit 128. The data DT1 selected by the second selection unit 124 is transferred to the operation unit 128 via the operand register 126.

In step S112, the selection signal generation unit 190 outputs the bypass selection signal SELp of "0x2" to the flip-flop circuit 192. That is, when the value of the read address signal RAp matches the value of the write address signal WAsx4, the selection signal generation unit 190 outputs the bypass selection signal SELp of "0x2" to the flip-flop circuit 192. Thereby, the second selection unit 124 receives the bypass selecting signal SELb of "0x2" from the flip-flop circuit 192 and selects the data DT2 to be bypass-transferred from the result register 130. The data DT2 selected by the second selection unit 124 is transferred to the operation unit 128 via the operand register 126.

In step S114, the selection signal generation unit 190 outputs the bypass selection signal SELp of "0x3" to the flip-flop circuit 192. That is, when the value of the read address signal RAp matches the value of the read address signal RAsb, the selection signal generation unit 190 outputs the bypass selection signal SELp of "0x3" to the flip-flop circuit 192. Thereby, the second selection unit 124 receives the bypass selecting signal SELb of "0x3" from the flip-flop circuit 192 and selects the data DT3 to be bypass-transferred from the operand register 126. The data DT3 selected by the second selection unit 124 is transferred to the operation unit 128 via the operand register 126.

In step S116, the selection signal generation unit 190 outputs the bypass selection signal SELp of "0x4" to the flip-flop circuit 192. That is, when the value of the read address signal RAp matches the value of the read address signal RAsx1, the selection signal generation unit 190 outputs the bypass selection signal SELp of "0x4" to the flip-flop circuit 192. Thereby, the second selection unit 124 receives the bypass selecting signal SELb of "0x4" from the flip-flop circuit 192 and selects the data DT4 to be bypass-transferred from the operand latch 127. The data DT4 selected by the second selection unit 124 is transferred to the operation unit 128 via the operand register 126.

In this way, the bypass transfer is executed by executing one of steps S110, S112, S114, and S116. After executing one of steps S110, S112, S114, and S116, the bypass control unit 150 moves the operation to step S118.

In step S118, the AND circuit 196 outputs a clock enable signal CEN of logical 0 to the timing adjustment unit 140. Thereby, the clock signal CK in the timing adjustment unit 140 is stopped and the operation of the timing adjustment unit 140 is stopped. Thereby, the transition of the address signal RAb output from the timing adjustment unit 140 can be stopped. In this way, when a bypass transfer is executed, the bypass control unit 150 can stop the transition of the read address signal RAb, which is output from the timing adjustment unit 140. As a result, it is possible to suppress a through current from flowing to a CMOS circuit to which the read address signal RAb is transferred (CMOS circuit included in the first selection unit 122 or the like), and to reduce the power consumption of the operation processing device 12.

Conversely, when a bypass transfer is not executed (when the determination results in steps S100, S102, S104, and S106 are all "No"), the bypass control unit 150 executes the process of step S120.

In step S120, the selection signal generation unit 190 outputs the bypass selection signal SELp "0x0" to the flip-flop circuit 192. Thereby, the second selection unit 124 receives the bypass selecting signal SELb of "0x0" from the flip-flop circuit 192 and selects the data DT0 to be read from the register file 120. The data DT0 selected by the second selection unit 124 is transferred to the operation unit 128 via the operand register 126. After executing the process of step S120, the bypass control unit 150 moves the operation to step S122.

In step S122, the AND circuit 196 outputs a clock enable signal CEN of logical 1 to the timing adjustment unit 140. In this case, the clock signal CK in the timing adjuster 140 does not stop. Therefore, the transition of the read address signal RAb output from the timing adjustment unit 140 does not stop.

Note that the operation of the operation processing device 12 is not limited to the example that is illustrated in FIG. 7. For example, the order of executing the processes of steps S100, S102, S104, and S106 may be an order different from the order illustrated in FIG. 7. Also, for example, the processes of steps S100, S102, S104, and S106 may be executed in parallel.

Figure 8A:
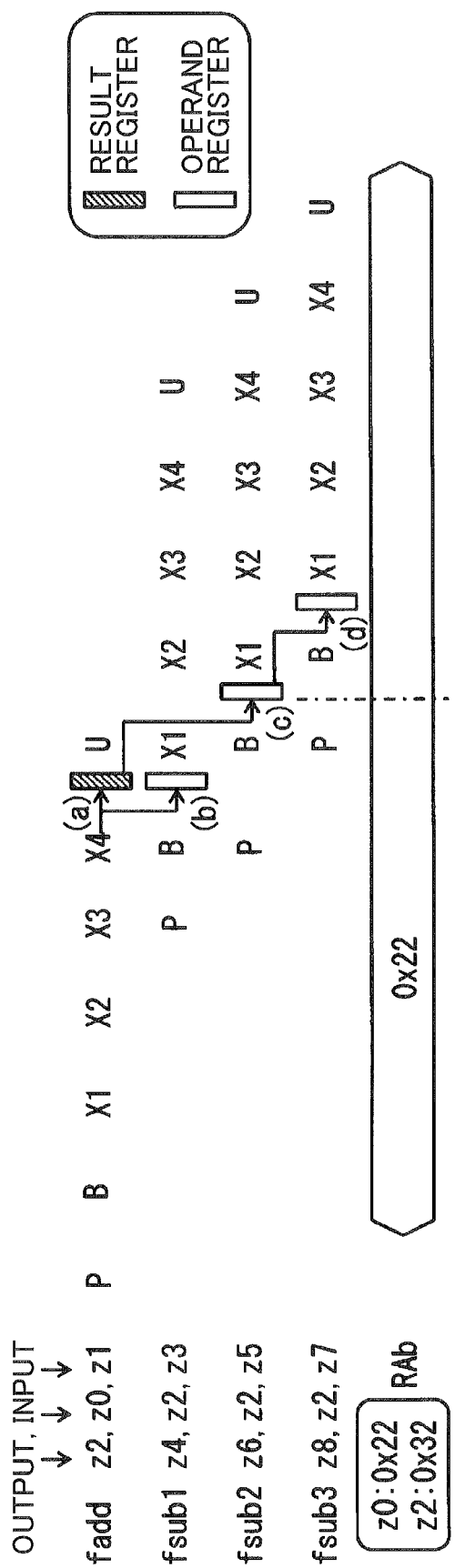
FIG. 8A is a diagram illustrating an example of an operation of the operation processing device that is illustrated in FIG. 3.

FIG. 8A illustrates an example of an operation of the operation processing device 12 that is illustrated in FIG. 3. In the operation illustrated in FIGS. 8A and 8B, the operation processing device 12 executes instructions fadd, fsub1, fsub2, and fsub3 in the order of the instructions fadd, fsub1, fsub2, and fsub3. The instruction fadd indicates an addition instruction of floating point operation, and the instruction fsub (fsub1, fsub2, fsub3) indicates a subtraction instruction of floating point operation.

Also, among the three signs z following the sign of each of the instructions fadd and fsub (fsub1, fsub2, fsub3), the leftmost sign z indicates a register 121 in which output data is stored, and the other signs z indicate registers 121 in which input data is stored. For example, the register z2 of the instruction fadd indicates the value of the write address signal WAp of the instruction fadd, and the register z0 of the instruction fadd indicates the value of the read address signal RAp of the instruction fadd. In the example illustrated in FIG. 8, the address of the register z0 is "0x22" and the address of the register z2 is "0x32".

Figure 8B:
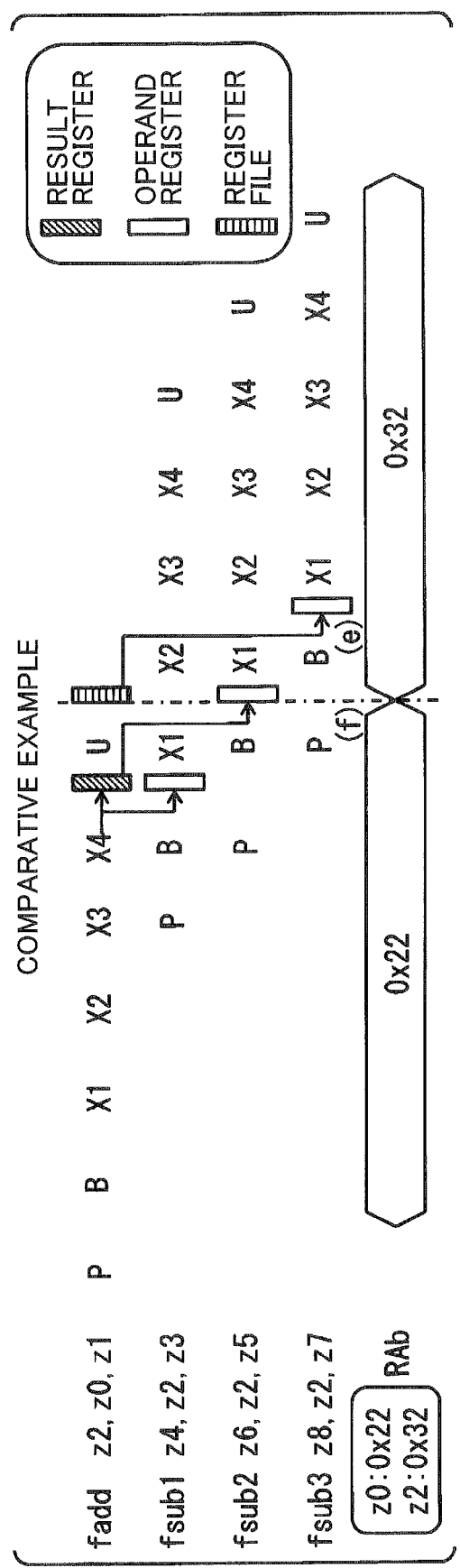
FIG. 8B is a diagram illustrating an example of an operation of a comparative example.

In FIGS. 8A and 8B, the hatched rectangles indicate the result register 130, the white rectangles indicate the operand register 126, and the rectangle with horizontal lines indicates the register file 120. In the brackets illustrated in FIG. 8B, a comparative example of the operation of the operation processing device 12 is illustrated. In the operation of the comparative example, in addition to conventional pipeline control of executing each instruction with the shortest pipeline without considering the reduction of power consumption, control of stopping the operation of the timing adjustment unit 140 is executed when a bypass transfer is executed.

The instructions fsub1, fsub2, and fsub3 use the operation result of the instruction fadd. That is, the instructions fsub1, fsub2, and fsub3 use data DT that is stored in the register z2. That is, there is a RAW dependence relationship between the instruction fadd and the instructions fsub1, fsub2, and fsub3. In FIGS. 8A and 8B, a flow of data DT that is stored in the register z2 and that is used in the instructions fadd, fsub1, fsub2, and fsub3 will be mainly described.

The data DT indicative of the operation result of the instruction fadd is held in the result register 130 ((a) of FIG. 8A). The data DT held in the result register 130 is written to the register file 120.

The operation of the instruction fsub1 is executed by directly bypass-transferring, to the operand register 126, the data DT indicative of the operation result of the instruction fadd ((b) of FIG. 8A). That is, the instruction fsub1 is executed with the shortest bypass that uses the operation result of the instruction fadd as it is. In this case, the operation processing device 12 can execute the operation of the instruction fsub1 by using the data DT bypass-transferred from the operation unit 128 without waiting for the operation result of the instruction fadd to be written in the register file 120. As a result, the performance of the operation processing device 12 can be enhanced as compared with a case where a bypass transfer is not executed.

The operation of the instruction fsub2 is executed by bypass-transferring, from the result register 130 to the operand register 126, the data DT indicative of the operation result of the instruction fadd ((c) of FIG. 8A). In this case also, the operation processing device 12 can execute the operation of the instruction fsub2 without waiting for the operation result of the instruction fadd to be written in the register file 120.

The instructions fsub2 and fsub3 have RAR dependence in which the instruction fsub3 reads the address of register z2 read by instruction fsub2. Hence, the operation of the instruction fsub3 is executed by bypass-transferring, from the output of the operand register 126 to the input of the operand register 126, the data DT indicative of the operation result of the instruction fadd ((d) of FIG. 8A).

Note that the data DT indicative of the operation result of the instruction fadd is written to the register file 120 before starting the operation of the instruction fsub3. Therefore, in the comparative example, the operation of the instruction fsub3 is executed by reading the data DT indicative of the operation result of the instruction fadd from the register file 120 ((e) of FIG. 8B). In this case, because the data DT is read from the register file 120, the value of the read address RADb transitions from "0x22" to "0x32" at the time of starting the B cycle of the instruction fsub3 ((f) of FIG. 8B). Therefore, in the comparative example, at the time of starting the B cycle of the instruction fsub3 (a period during which the value of the read address RADb changes from "0x13" to "0x32"), a through current flows.

Conversely, as described above, the operation processing device 12 executes the operation of the instruction fsub3 without reading, from the register file 120, the data DT indicative of the operation result of the instruction fadd. Therefore, according to the operation processing device 12, it is possible to stop the transition of the read address RADb and it is possible to suppress a through current from flowing.

As a result, it is possible to reduce the power consumption of the operation processing device 12 as compared with the operation of the comparative example.

Figure 9A:
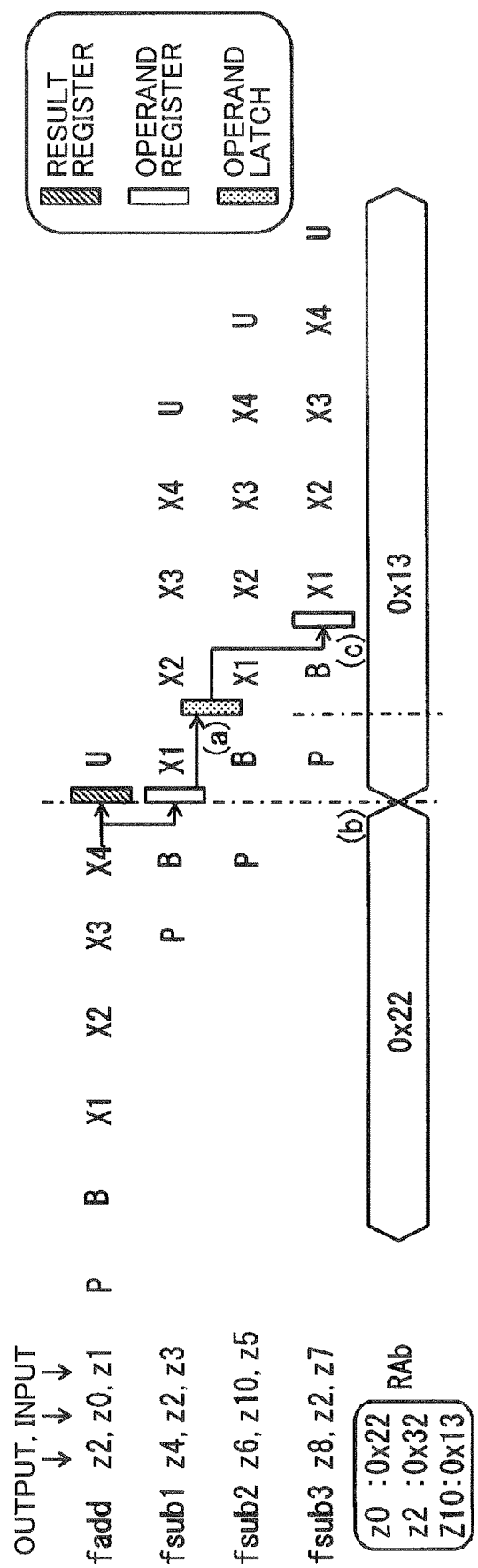
FIG. 9A is a diagram illustrating another example of an operation of the operation processing device that is illustrated in FIG. 3.
Figure 9B:
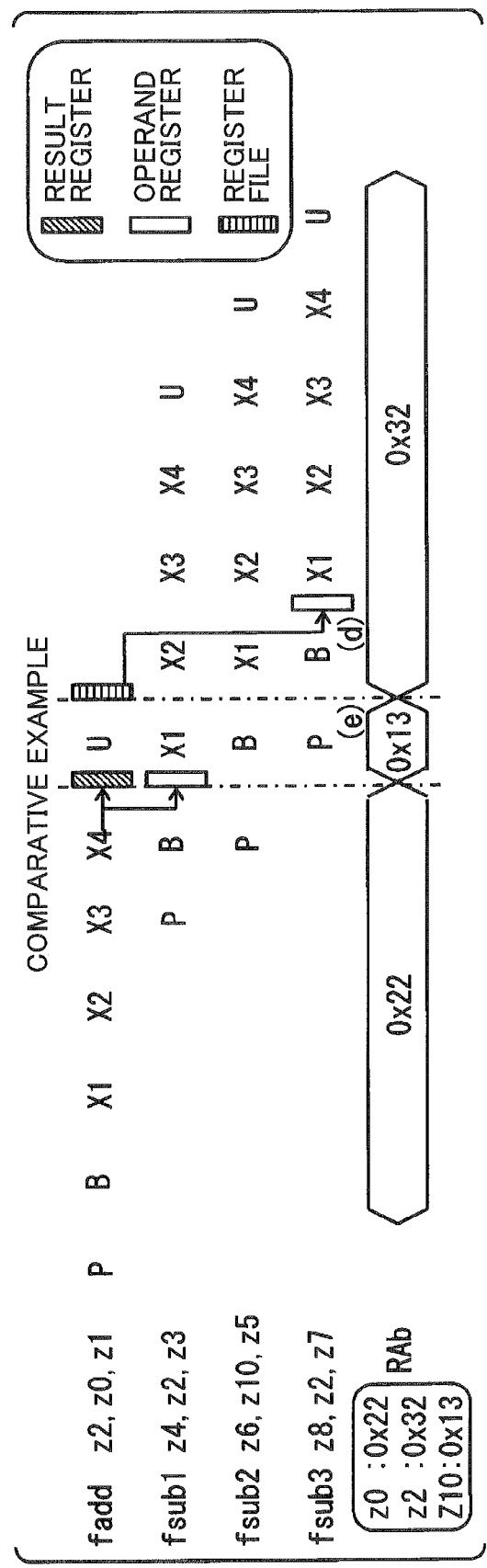
FIG. 9B is a diagram illustrating an example of an operation of a comparative example.

FIG. 9A illustrates another example of the operation of the operation processing device 12 that is illustrated in FIG. 3. In the operation illustrated in FIGS. 9A and 9B, the operation processing device 12 executes instructions fadd, fsub1, fsub2, and fsub3 in the order of the instructions fadd, fsub1, fsub2, and fsub3. In FIGS. 9A and 9B, the operation processing device 12 executes the instruction "fsub2 z6, z10, z5" instead of the instruction "fsub2 z6, z2, z5" illustrated in FIGS. 8A and 8B. Therefore, there is a RAW dependence relationship between the instruction fadd and the instructions fsub1 and fsub3 similar to FIGS. 8A and 8B, and there is no dependence relationship between the instruction fsub2 and the instructions fadd, fsub1, and fsub3. In the example illustrated in FIGS. 9A and 9B, the address of the register z0 is "0x22", the address of the register z2 is "0x32", and the address of the register z10 is "0x13".

In FIGS. 9A and 9B, the hatched rectangles indicate the result register 130, the white rectangles indicate the operand register 126, the rectangle with horizontal lines indicates the register file 120, and the shaded rectangle indicates the operand latch 127. In the brackets illustrated in FIG. 9B, a comparative example of the operation of the operation processing device 12 is illustrated. In FIGS. 9A and 9B, a flow of data DT that is stored in the register z2 and that is used in the instructions fadd, fsub1, and fsub3 will be mainly described.

The operation of the instruction fadd and the operation of the instruction fsub1 are executed in the same as or similar to the operations described with reference to FIGS. 8A and 8B. Note that in order to execute the operation of the instruction fsub1, the data DT indicative of the operation result of the instruction fadd is transferred from the operand register 126 to the operation unit 128 and is also transferred to the operand latch 127 after being held in the operand register 126. Thereby, the operand latch 127 holds the data DT indicative of the operation result of the instruction fadd ((a) of FIG. 9A).

The operation of the instruction fsub2 is executed by reading the data DT stored in the register z10 etc. from the register file 120. Therefore, the value of the read address RADb transitions from "0x22" to "0x13" at the time of starting the B cycle of the instruction fsub2 ((b) of FIG. 9A).

The operation of the instruction fsub3 is executed by bypass-transferring, from the operand latch 127 to the operand register 126, the data DT indicative of the operation result of the instruction fadd ((c) of FIG. 9A). Note that in the operation of the instruction fsub3 illustrated in FIG. 9A, because the data DT read from the register z10 is held in the operand register 126, a bypass route different from the bypass route illustrated in FIG. 8A (a bypass from the operand latch 127) is selected.

Note that in the comparative example, similar to the comparative example illustrated in FIG. 8B, the operation of the instruction fsub3 is executed by reading the data DT indicative of the operation result of the instruction fadd from the register file 120 ((d) of FIG. 9B). Thus, the value of the read address RADb transitions from "0x13" to "0x32" at the time of starting the B cycle of the instruction fsub3 ((e) of FIG. 9B). Therefore, in the comparative example, at the time of starting the B cycle of the instruction fsub3 (a period during which the value of the read address RADb changes from "0x13" to "0x32"), a through current flows.

Conversely, as described above, the operation processing device 12 executes the operation of the instruction fsub3 without reading, from the register file 120, the data DT indicative of the operation result of the instruction fadd. Therefore, according to the operation processing device 12, it is possible to stop the transition of the read address RADb and it is possible to suppress a through current from flowing. As a result, it is possible to reduce the power consumption of the operation processing device 12 as compared with the operation of the comparative example.

In this way, by arranging the operand latch 127 between the operand register 126 and the second selection unit 124, it is possible to add a bypass route different from the bypass route for bypass-transferring data DT directly from the operand register 126. Thereby, it is possible to enhance the performance of the operation processing device 12 and to reduce the power consumption as compared with a case where an operand latch 127 is not arranged.

Figure 10A:
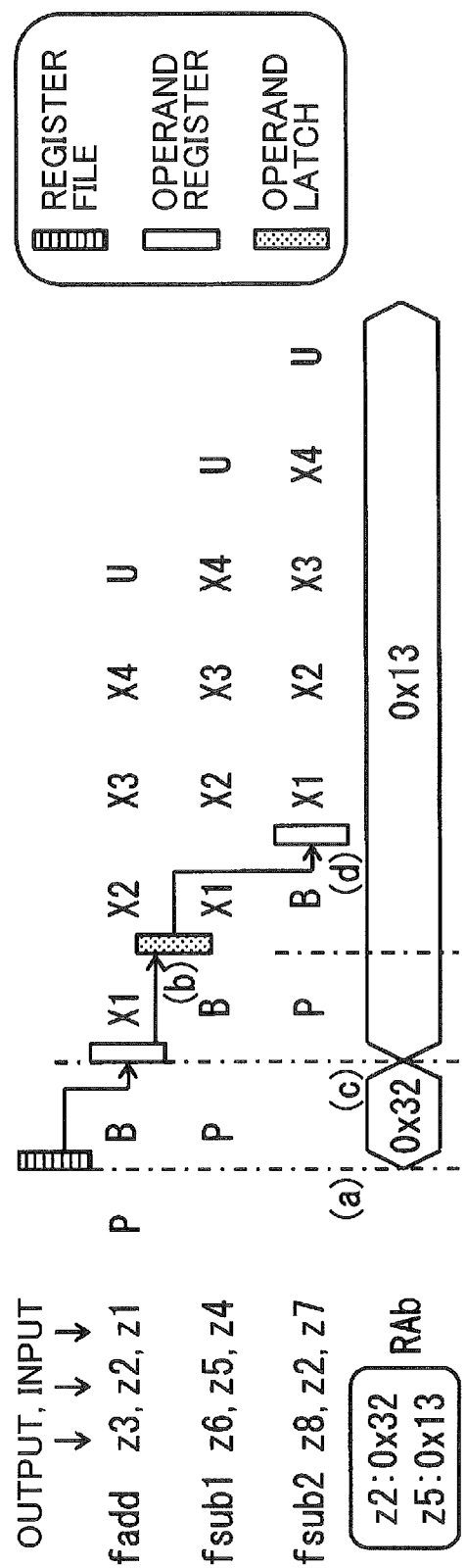
FIG. 10A is a diagram illustrating another example of an operation of the operation processing device that is illustrated in FIG. 3.
Figure 10B:
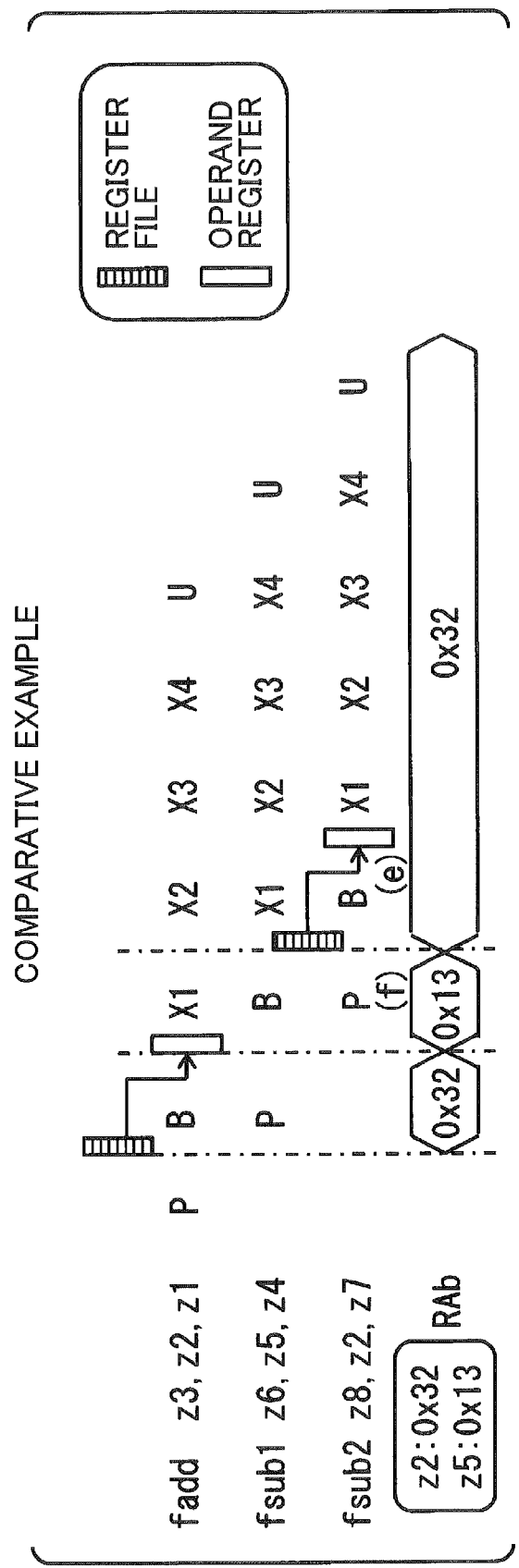
FIG. 10B is a diagram illustrating an example of an operation of a comparative example.

FIG. 10A illustrates another example of the operation of the operation processing device 12 that is illustrated in FIG. 3. In the operation illustrated in FIGS. 10A and 10B, the operation processing device 12 executes instructions fadd, fsub1, and fsub2 in the order of the instructions fadd, fsub1, and fsub2. In FIGS. 10A and 10B, the operation processing device 12 executes the instruction "fadd z3, z2, z1" and the instruction "fsub1 z6, z5, z4" instead of the instruction "fsub1 z4, z2, z3" and the instruction "fsub2 z6, z10, z5" illustrated in FIGS. 9A and 9B. Then, the operation processing device 12 executes the instruction "fsub2 z8, z2, z7" instead of the instruction "fsub3 z8, z2, z7" illustrated in FIGS. 9A and 9B. Therefore, there is a RAR dependence relationship between the instruction fadd and the instruction fsub2, and there is no dependence relationship between the instruction fsub1 and the instructions fadd and fsub2. In the example illustrated in FIGS. 10A and 10B, the address of the register z2 is "0x32", and the address of the register z5 is "0x13".

In FIGS. 10A and 10B, the white rectangles indicate the operand register 126, the rectangles with horizontal lines indicate the register file 120, and the shaded rectangle indicates the operand latch 127. In the brackets illustrated in FIG. 10B, a comparative example of the operation of the operation processing device 12 is illustrated. In FIGS. 10A and 10B, a flow of data DT that is stored in the register z2 and that is used in the instructions fadd and fsub2 will be mainly described.

The operation of the instruction fadd is executed by reading the data DT stored in the register z2 etc. from the register file 120. Therefore, the value of the read address RADb transitions to "0x32" at the time of starting the B cycle of the instruction fadd ((a) of FIG. 10A). Note that the data DT read from the register z2 is transferred from the operand register 126 to the operation unit 128 and is also transferred to the operand latch 127 after being held in the operand register 126. Thereby, the operand latch 127 holds the data DT read from the register z2 ((b) of FIG. 10A).

The operation of the instruction fsub1 is executed by reading the data DT stored in the register z5 etc. from the register file 120. Therefore, the value of the read address RADb transitions from "0x32" to "0x13" at the time of starting the B cycle of the instruction fsub1 ((c) of FIG. 10A).

The operation of the instruction fsub2 is executed by bypass-transferring, from the operand latch 127 to the operand register 126, the data DT read from the register z2 by the instruction fadd ((d) of FIG. 10A).

Note that in the comparative example, the operation of the instruction fsub2 is executed by reading the data DT stored in the register z2 from the register file 120 ((e) of FIG. 10). Therefore, the value of the read address RADb transitions from "0x13" to "0x32" at the time of starting the B cycle of the instruction fsub2 ((f) of FIG. 10B). Therefore, in the comparative example, at the time of starting the B cycle of the instruction fsub2 (a period during which the value of the read address RADb changes from "0x13" to "0x32"), a through current flows.

Conversely, as described above, the operation processing device 12 executes the operation of the instruction fsub2 without again reading, from the register file 120, the data DT read from the register z2 by the instruction fadd. Therefore, according to the operation processing device 12, it is possible to stop the transition of the read address RADb and it is possible to suppress a through current from flowing. As a result, it is possible to reduce the power consumption of the operation processing device 12 as compared with the operation of the comparative example. Note that the operation of the operation processing device 12 is not limited to the examples that are illustrated in FIG. 8 to FIG. 10.

Figure 11:
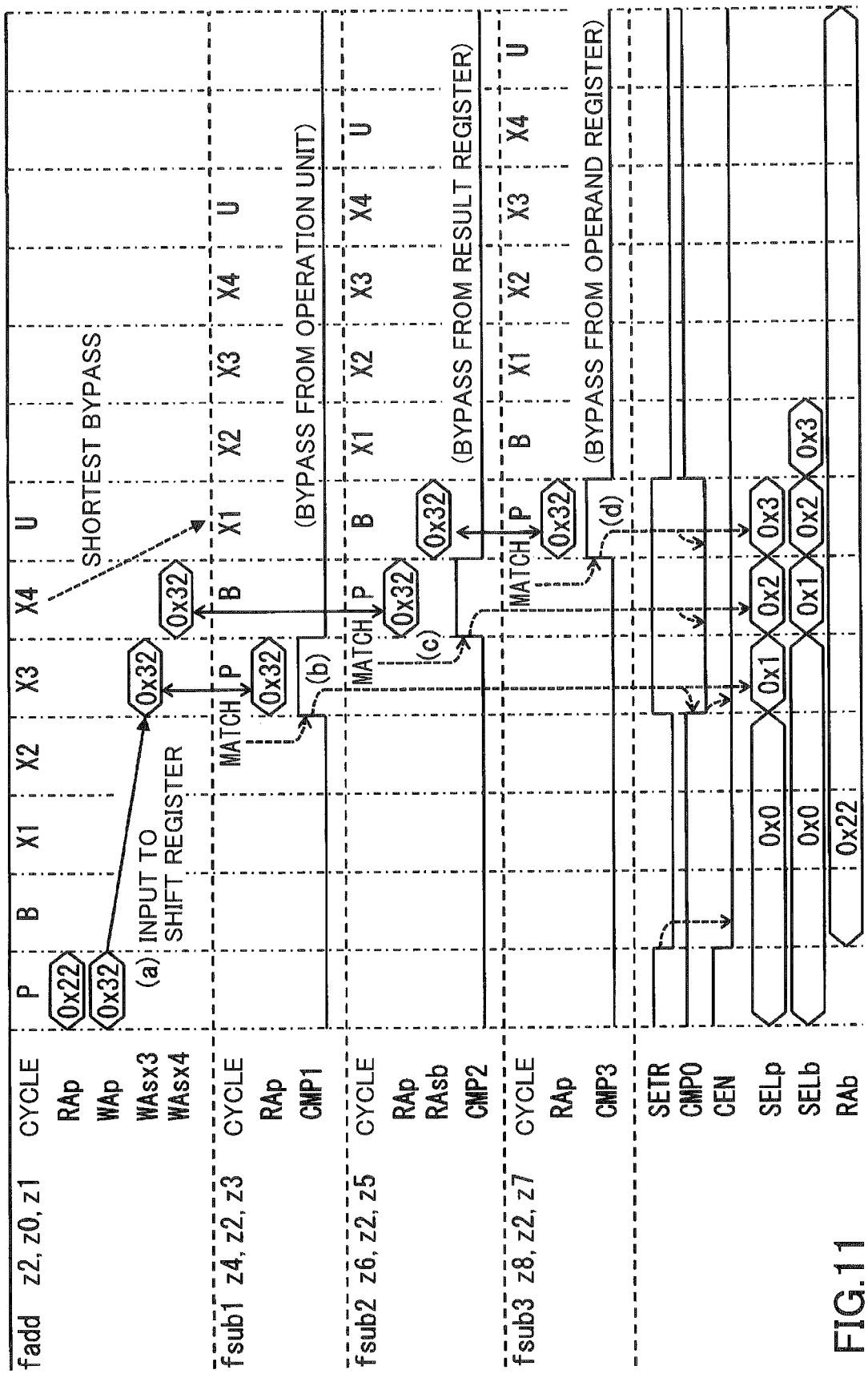
FIG. 11 is a diagram illustrating an example of a state of internal signals of the bypass control unit that is illustrated in FIG. 5.

FIG. 11 illustrates an example of a state of internal signals of the bypass control unit 150 that is illustrated in FIG. 5. Note that FIG. 11 illustrates an example of the state of internal signals of the bypass control unit 150 for when the operation illustrated in FIGS. 8A and 8B is executed.

In the first P cycle (P cycle of the instruction fadd), the read address signal RAp ("0x22") of the instruction fadd is transferred from the reservation station 114 to the comparison units 181, 182, 183, and 184 and the shift register 170. Further, the write address signal WAp ("0x32") of the instruction fadd is input from the reservation station 114 to the shift register 160 (more specifically, to the flip-flop circuit 161) ((a) of FIG. 11). Thereby, the write address signal WAp ("0x32") is held in the flip-flop circuit 161.

When the instruction fsub1 subsequent to the instruction fadd uses the operation result of the instruction fadd with the shortest bypass, the P cycle of the instruction fsub1 is started in accordance with the start of the X3 cycle of the instruction fadd. Therefore, the write address signal WAp ("0x32") is still held by the shift register 160 in the X3 cycle of the instruction fadd. In the X3 cycle of the instruction fadd, the write address signal WAp ("0x32") is output, as the write address signal WAsx3 ("0x32"), from the flip-flop circuit 164 to the comparison unit 181.

In the P cycle of the instruction fsub1, the read address signal RAp ("0x32") of the instruction fsub1 matches the write address signal WAsx3 ("0x32") that is output from the flip-flop circuit 164 ((b) of FIG. 11). Therefore, the comparison unit 181 outputs the signal CMP1 of logical 1 to the selection signal generation unit 190 and the NOR circuit 194. Upon receiving the signal CMP1 of logical 1, the selection signal generation unit 190 outputs, to the flip-flop circuit 192, the bypass selection signal SELp ("0x1") for selecting the shortest bypass route. Thereby, in the B cycle of the instruction fsub1, the bypass selection signal SELb of "0x1" is transferred from the flip-flop circuit 192 to the second selection unit 124. Therefore, based on the bypass selection signal SELb of "0x1", the second selection unit 124 stores, in the operand register 126, the data DT1, bypass-transferred from the operation unit 128, as the operation result of the instruction fadd.

Note that in the P cycle of instruction fsub1, because the signal CMP1 is logical 1, the signal CMP0 and the clock enable signal CEN are logical 0. Therefore, the clock signal CK of the timing adjustment unit 140 is stopped. As a result, the read address signal RAb output from the timing adjustment unit 140 does not change from the read address signal RAp ("0x22") of the instruction fadd even when the B cycle of the instruction fsub1 is started.

Because there is an interval for one instruction (instruction fsub1) from the instruction fadd, the instruction fsub2 uses the operation result of the instruction fadd two cycles after the X4 cycle of the instruction fadd. In this case, the operation result of the instruction fadd is bypass-transferred from the result register 130 to the operand register 126. When the operation result of the instruction fadd is bypass-transferred from the result register 130, the write address signal WAp ("0x32") is still held by the shift register 160 in the X4 cycle (X4 cycle of the instruction fadd) one cycle longer than in the case of the instruction fsub1. In the X4 cycle of the instruction fadd, the write address signal WAp ("0x32") is output, as the write address signal WAsx4 ("0x32"), from the flip-flop circuit 165 to the comparison unit 182.

In the P cycle of the instruction fsub2, the read address signal RAp ("0x32") of the instruction fsub2 matches the write address signal WAsx4 ("0x32") that is output from the flip-flop circuit 165 ((c) of FIG. 11). Therefore, the comparison unit 182 outputs the signal CMP2 of logical 1 to the selection signal generation unit 190 and the NOR circuit 194. Upon receiving the signal CMP2 of logical 1, the selection signal generation unit 190 outputs, to the flip-flop circuit 192, the bypass selection signal SELp ("0x2") for selecting a bypass route from the result register 130. Thereby, in the B cycle of the instruction fsub2, the bypass selection signal SELb of "0x2" is transferred from the flip-flop circuit 192 to the second selection unit 124. Therefore, based on the bypass selection signal SELb of "0x2", the second selection unit 124 stores, in the operand register 126, the data DT2, bypass-transferred from the result register 130, as the operation result of the instruction fadd.

Note that in the P cycle of instruction fsub2, because the signal CMP2 is logical 1, the signal CMP0 and the clock enable signal CEN are logical 0. Therefore, the read address signal RAb output from the timing adjustment unit 140 does not change from the read address signal RAp ("0x22") of the instruction fadd even when the B cycle of the instruction fsub2 is started.

In the instruction fsub3 that is executed after the instruction fsub2, the operation result of the instruction fadd has already been written in the register file 120. Hence, in the instruction fsub3, data DT stored in the operand register 126 as the operation result of the instruction fadd in the B cycle of the instruction fsub2 is bypass-transferred from the output of the operand register 126 to the input of the operand register 126. In this way, by bypass-transferring, from the output of the operand register 126 to the input of the operand register 126, the data DT used in the instruction fsub2, the transition of the read address signal RAp can be stopped as described with reference to FIGS. 8A and 8B and the like. As a result, the power consumption can be reduced as compared with a case of reading the data DT used in the instruction fsub2 from the register file 120.

When bypass-transferring the data DT from the output of the operand register 126 to the input of the operand register 126, the read address signal RAp ("0x32") of the instruction fsub2 is still held by the shift register 170 in the B cycle of the instruction fsub2. In the B cycle of the instruction fsub2, the read address signal RAp ("0x32") is output, as the read address signal RAsb ("0x32"), from the flip-flop circuit 171 to the comparison unit 183.

In the P cycle of the instruction fsub3, the read address signal RAp ("0x32") of the instruction fsub3 matches the read address signal RAsb ("0x32") that is output from the flip-flop circuit 171 ((d) of FIG. 11). Therefore, the comparison unit 183 outputs the signal CMP3 of logical 1 to the selection signal generation unit 190 and the NOR circuit 194. Upon receiving the signal CMP3 of logical 1, the selection signal generation unit 190 outputs, to the flip-flop circuit 192, the bypass selection signal SELp ("0x3") for selecting a bypass route from the operand register 126. Thereby, in the B cycle of the instruction fsub3, the bypass selection signal SELb of "0x3" is transferred from the flip-flop circuit 192 to the second selection unit 124. Therefore, based on the bypass selection signal SELb of "0x3", the second selection unit 124 stores, in the operand register 126, the data DT3, bypass-transferred from the operand register 126, as the operation result of the instruction fadd.

Note that in the P cycle of instruction fsub3, because the signal CMP3 is logical 1, the signal CMP0 and the clock enable signal CEN are logical 0. Therefore, the read address signal RAb output from the timing adjustment unit 140 does not change from the read address signal RAp ("0x22") of the instruction fadd even when the B cycle of the instruction fsub3 is started.

In this way, even at timing when the data DT can be read from the register file 120, the bypass control unit 150 can stop the transition of the read address signal RAp by bypass-transferring the data DT from the operand register 126. As a result, the power consumption can be reduced as compared with a case of reading the data DT from the register file 120.

Note that control of bypass-transferring the data DT from the operand register 126 can be applied between the instructions fsub2 and fsub3 or between the instructions fsub1 and fsub2 having RAR dependence even when the operation result of the instruction fadd is not stored in the register z2. That is, even to two instructions having no RAW dependence, when having RAR dependence, control of bypass-transferring the data DT from the operand register 126 can be applied.

Figure 12:
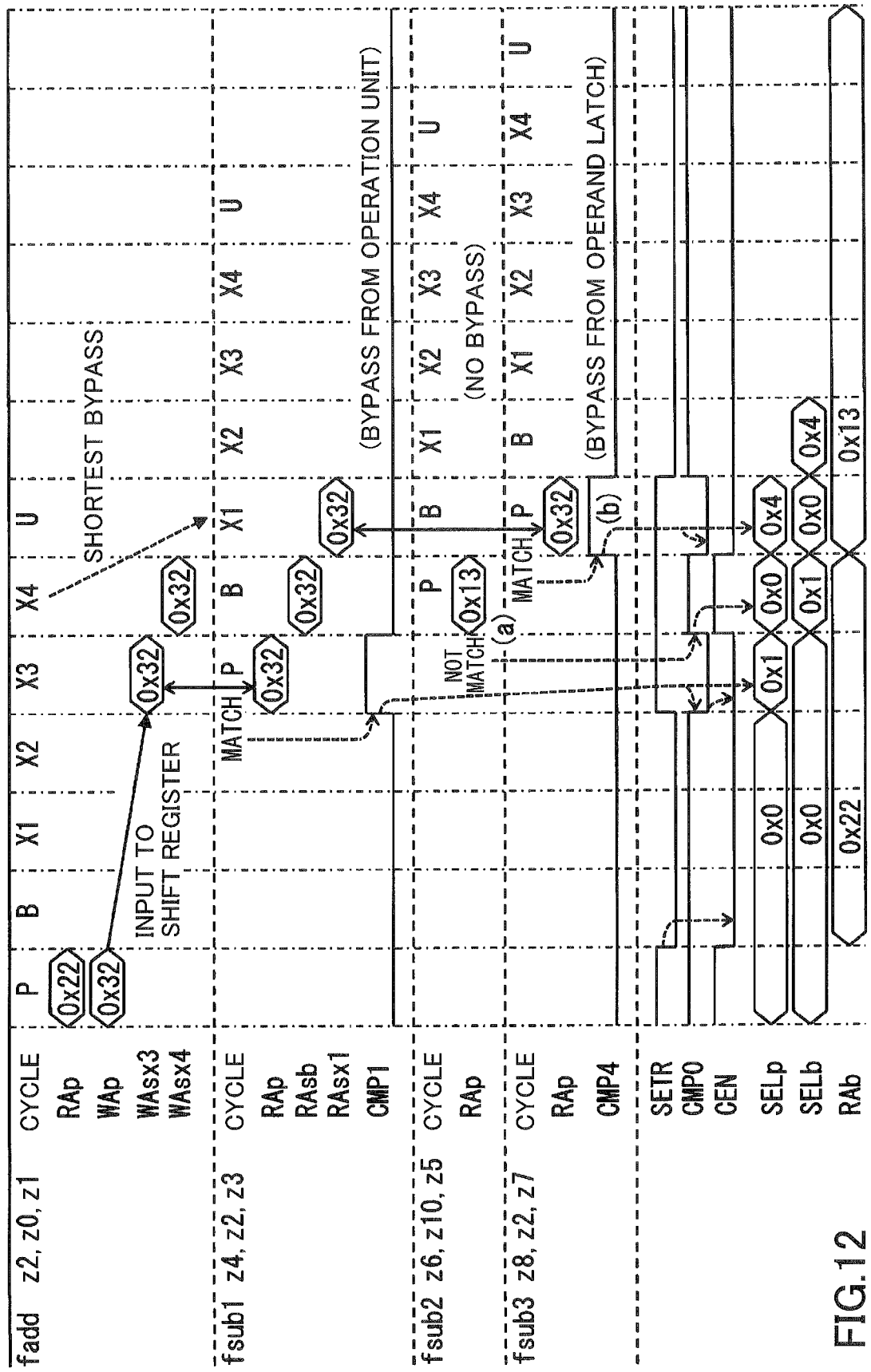
FIG. 12 is a diagram illustrating another example of a state of internal signals of the bypass control unit that is illustrated in FIG. 5.

FIG. 12 illustrates another example of a state of internal signals of the bypass control unit 150 that is illustrated in FIG. 5.

Note that FIG. 12 illustrates an example of the state of internal signals of the bypass control unit 150 for when the operation illustrated in FIGS. 9A and 9B is executed. Detailed descriptions of operations the same as or similar to the operations described with reference to FIG. 11 will be omitted. In FIG. 12, instead of the instruction "fsub2 z6, z2, z5" illustrated in FIG. 11, the instruction "fsub2 z6, z10, z5" is executed.

Before the P cycle of the instruction fsub1, operations of internal signals of the bypass control unit 150 are the same as or similar to the operations described with reference to FIG. 11.

As described with reference to FIG. 9, the instruction fsub2 has no dependence relationship with the instructions fadd, fsub1, and fsub3. Therefore, in the P cycle of the instruction fsub2, the read address signal RAp ("0x13") of the instruction fsub2 matches none of the read address signals RAsb and RAsx1 and the write address signals WAsx3 and WAsx4 ((a) of FIG. 12). Therefore, the signals CMP1, CMP2, CMP3, and CMP4 become logical 0 and the signal CMP0 and the clock enable signal CEN become logical 1. As the clock enable signal CEN transitions to logical 1, the read address signal RAb transitions from "0x22" to "0x13" in the B cycle of the instruction fsub2.

Upon receiving the signals CMP1, CMP2, CMP3, and CMP4 of logical 0, the selection signal generation unit 190 outputs, to the flip-flop circuit 192, the bypass selection signal SELp ("0x0") for selecting the data DT0 read from the register file 120. Thereby, in the B cycle of the instruction fsub2, the bypass selection signal SELb of "0x0" is transferred from the flip-flop circuit 192 to the second selection unit 124. Therefore, based on the bypass selection signal SELb of "0x0", the second selection unit 124 stores, in the operand register 126, the data DT0, read from the register file 120 (register 121 indicated by the address of the register z10).

Because there is an interval for one instruction (instruction fsub2) from the instruction fsub1 having RAR dependence, the instruction fsub3 uses data DT, used in the instruction fsub1, two cycles after the X1 cycle of the instruction fsub1. In this case, the data DT used in the instruction fsub1 is bypass-transferred from the operand latch 127 to the operand register 126. When the data DT used in the instruction fsub1 is bypass-transferred from the operand latch 127, the read address signal RAp ("0x32") of the instruction fsub1 is still held by the shift register 160 in the X1 cycle of the instruction fsub1. In the X1 cycle of the instruction fsub1, the read address signal RAp ("0x32") is output from the flip-flop circuit 172 to the comparison unit 184 as the read address signal RAsx1 ("0x32").

In the P cycle of the instruction fsub3, the read address signal RAp ("0x32") of the instruction fsub3 matches the read address signal RAsx1 ("0x32") that is output from the flip-flop circuit 172 ((b) of FIG. 12). Therefore, the comparison unit 184 outputs the signal CMP4 of logical 1 to the selection signal generation unit 190 and the NOR circuit 194. Upon receiving the signal CMP4 of logical 1, the selection signal generation unit 190 outputs, to the flip-flop circuit 192, the bypass selection signal SELp ("0x4") for selecting a bypass route from the operand latch 127. Thereby, in the B cycle of the instruction fsub3, the bypass selection signal SELb of "0x4" is transferred from the flip-flop circuit 192 to the second selection unit 124. Therefore, based on the bypass selection signal SELb of "0x4", the second selection unit 124 stores, in the operand register 126, the data DT4 bypass-transferred from the operation latch 127.

Note that in the P cycle of instruction fsub3, because the signal CMP4 is logical 1, the signal CMP0 and the clock enable signal CEN transition from logical 1 to logical 0. Therefore, the read address signal RAb output from the timing adjustment unit 140 does not change from the read address signal RAp of the instruction fsub2 ("0x13") even when the B cycle of the instruction fsub3 is started. As a result, the power consumption can be reduced as compared with a case of reading the data DT from the register file 120.

Figure 13:
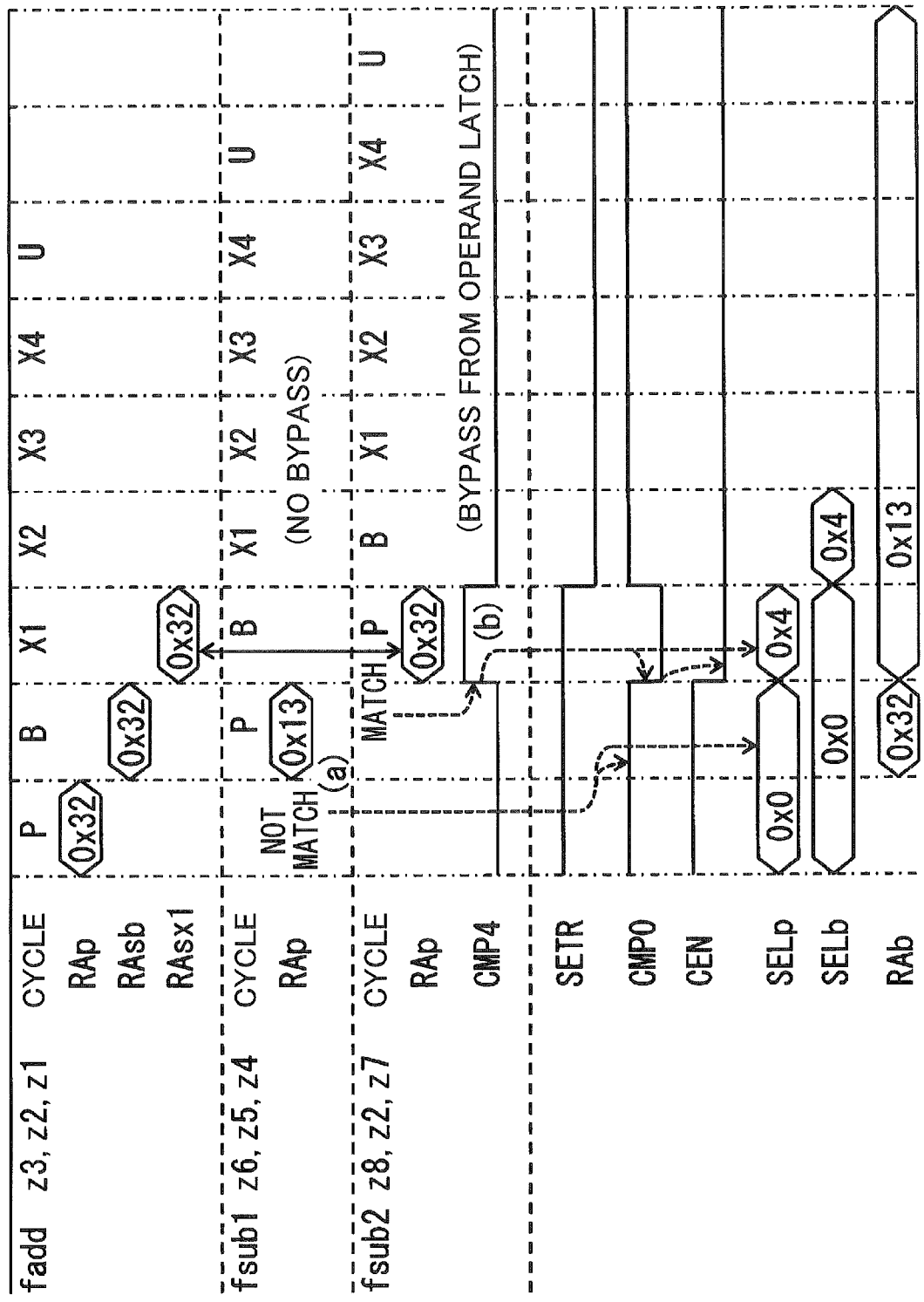
FIG. 13 is a diagram illustrating another example of a state of internal signals of the bypass control unit that is illustrated in FIG. 5.

FIG. 13 illustrates another example of a state of internal signals of the bypass control unit 150 that is illustrated in FIG. 5. Note that FIG. 13 illustrates an example of the state of internal signals of the bypass control unit 150 for when the operation illustrated in FIGS. 10A and 10B is executed. Detailed descriptions of operations the same as or similar to the operations described with reference to FIG. 11 and FIG. 12 will be omitted. There is RAR dependence between the instruction fadd and the instruction fsub2, and there is no dependence relationship between the instruction fsub1 and the instructions fadd and fsub2. Therefore, a flow of data DT and the like for when executing the instructions fadd, fsub1 and fsub2 illustrated in FIG. 13 is similar to that of data DT for when executing the instructions fsub1, fsub2, and fsub3 illustrated in FIG. 12.

For example, the read address signal RAp ("0x32") of the instruction fadd input to the shift register 170 in the P cycle of the instruction fadd is still held in the X1 cycle of the instruction fadd. Then, in the X1 cycle of the instruction fadd, the read address signal RAp ("0x32") is output, as the read address signal RAsx1 ("0x32"), from the flip-flop circuit 172 to the comparison unit 184.

In the P cycle of the instruction fsub1, the read address signal RAp ("0x13") of the instruction fsub1 having no RAR dependence or the like matches none of the read address signals RAsb and RAsx1 and the write address signals WAsx3 and WAsx4 ((a) of FIG. 13). Therefore, the signals CMP1, CMP2, CMP3, and CMP4 are maintained at logical 0 and the signal CMP0 and the clock enable signal CEN are maintained at logical 1. Because the clock enable signal CEN is maintained at logical 1, the read address signal RAb transitions from "0x32" to "0x13" in the B cycle of the instruction fsub1.

Upon receiving the signals CMP1, CMP2, CMP3, and CMP4 of logical 0, the selection signal generation unit 190 outputs, to the flip-flop circuit 192, the bypass selection signal SELp ("0x0") for selecting the data DT0 read from the register file 120. Thereby, in the B cycle of the instruction fsub1, the bypass selection signal SELb of "0x0" is transferred from the flip-flop circuit 192 to the second selection unit 124. Therefore, based on the bypass selection signal SELb of "0x0, the second selection unit 124 stores, in the operand register 126, the data DT0, read from the register file 120 (register 121 indicated by the address of the register z5).

Because there is an interval for one instruction (instruction fsub1) from the instruction fadd having RAR dependence, the instruction fsub2 uses data DT, which is used in the instruction fadd, two cycles after the X1 cycle of the instruction fadd. In this case, the data DT that is used in the instruction fadd is bypass-transferred from the operand latch 127 to the operand register 126.

In the P cycle of the instruction fsub2, the read address signal RAp ("0x32") of the instruction fsub2 matches the read address signal RAsx1 ("0x32") that is output from the flip-flop circuit 172 ((b) of FIG. 13). Therefore, the comparison unit 184 outputs the signal CMP4 of logical 1 to the selection signal generation unit 190 and the NOR circuit 194. Upon receiving the signal CMP4 of logical 1, the selection signal generation unit 190 outputs, to the flip-flop circuit 192, the bypass selection signal SELp ("0x4") for selecting a bypass route from the operand latch 127. Thereby, in the B cycle of the instruction fsub2, the bypass selection signal SELb of "0x4" is transferred from the flip-flop circuit 192 to the second selection unit 124. Therefore, based on the bypass selection signal SELb of "0x4", the second selection unit 124 stores, in the operand register 126, the data DT4 bypass-transferred from the operation latch 127.

Note that in the P cycle of instruction fsub2, because the signal CMP4 is logical 1, the signal CMP0 and the clock enable signal CEN transition from logical 1 to logical 0. Therefore, the read address signal RAb output from the timing adjustment unit 140 does not change from the read address signal RAp ("0x13") of the instruction fsub1 even when the B cycle of the instruction fsub2 is started. As a result, the power consumption can be reduced as compared with a case of reading the data DT from the register file 120.

As described above, effects similar to those of the embodiment illustrated in FIG. 1 and FIG. 2 can also be obtained by the embodiment illustrated in FIG. 3 to FIG. 13. For example, when transferring, data DT to the operand register 126 without passing through the register file 120, the bypass control unit 150 stops the operation of the timing adjustment unit 140. Thereby, it is possible to stop the transition of the address signal RAb that is supplied from the timing adjustment unit 140 to the first selection unit 122, and to suppress a through current from flowing to a CMOS circuit included in the first selection unit 122 or the like. As a result, it is possible to reduce the power consumption of the first selection unit 122 and the like, and to reduce the power consumption of the operation processing device 12.

Further, in the operation processing device 12, the number of bypass routes is increased as compared with the operation processing device 10, which is illustrated in FIG. 1. As a result, reading of data DT from the register file 120 can be suppressed. For example, even with respect to two instructions without RAW dependence, when there is RAR dependency, it is possible to select a bypass from the operand register 126 or the operand latch 127. Thereby, as compared with the operation processing device 10 illustrated in FIG. 1, it is possible to suppress the reading of data DT from the register file 120 and it is possible to suppress the transition of the read address signal RAb. As a result, it is possible to reduce the power consumption of the operation processing device 12.

According to the above detailed description, specific features and advantages of the embodiments will be clear. This is intended so that claims extend to the above mentioned specific features and advantages of the embodiments without departing from the spirit and scope of the invention. Further, a person having ordinary skill in the art should be able to conceive various enhancements and alterations easily. Accordingly, the above embodiments are not intended to limit scope of inventive embodiments to the extent described in the above embodiments, and the scope may include an enhanced product or an equivalent product.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A processor core for out-of-order execution comprising:
   an operation unit configured to execute an operation;
   a first register unit including a plurality of first registers configured to hold data to be used for the operation in the operation unit;
   a first selection unit configured to receive a read address signal and to select data held by a first register, indicated by the read address signal, among the plurality of first registers;
   a second selection unit configured to select, based on a bypass selection signal, data from a data group including the data selected by the first selection unit and data indicative of a result of the operation executed by the operation unit;
   a second register unit configured to hold the data selected by the second selection unit and to output the held data to the operation unit;
   a timing adjustment unit configured to output the read address signal to the first selection unit;
   a storage unit configured to sequentially store the read address signal; and
   a bypass control unit configured to generate the bypass selection signal based on a write address signal of a preceding instruction and a read address signal of a subsequent instruction or a read address signal of a preceding instruction and the read address signal of the subsequent instruction, where the write address signal of the preceding instruction, the read address signal of the subsequent instruction, or the read address signal of the preceding instruction is indicative of a first register in which the data indicative of the result of the operation in the operation unit is to be stored,
   wherein when the read address signal of the subsequent instruction matches the read address signal of the preceding instruction, the second selection unit is configured to select data read by the preceding instruction for the read address signal without instruction retirements based on the bypass selection signal and the bypass control unit is configured to stop an operation of the timing adjustment unit, and
   wherein when the read address signal of the subsequent instruction matches the write address signal of the preceding instruction, the second selection unit is configured to select the data indicative of the result of the operation executed by the operation unit without instruction retirements based on the bypass selection signal and the bypass control unit is configured to stop the operation of the timing adjustment unit.

2. The processor core according to claim 1,
   wherein the timing adjustment unit outputs the read address signal to the first selection unit in synchronization with a clock signal, and
   wherein when generating the bypass selection signal indicative of a selection of data other than the data selected by the first selection unit from the data group, the bypass control unit stops the clock signal of the timing adjustment unit to stop the operation of the timing adjustment unit.

3. The processor core according to claim 1,
   wherein when generating the bypass selection signal indicative of a selection of data other than the data selected by the first selection unit from the data group, the bypass control unit stops the operation of the timing adjustment unit to stop transition of the read address signal, which is output from the timing adjustment unit to the first selection unit.

4. The processor core according to claim 1, further comprising:
   a third register configured to hold data output from the second register unit to the operation unit and to output the held data to the second selection unit,
   wherein the second selection unit selects, based on the bypass selection signal, data from a data group including the data selected by the first selection unit, the data indicative of the result of the operation executed by the operation unit, the data output from the second register unit, and the data output from the third register unit, and outputs the selected data to the second register unit.

5. The processor core according to claim 1,
   wherein the second selection unit selects, based on the bypass selection signal, data from a data group including the data selected by the first selection unit, the data indicative of the result of the operation executed by the operation unit, and the data output from the second register unit, and outputs the selected data to the second register unit.

6. The processor core according to claim 1, further comprising:

an input unit configured to output the read address signal to the timing adjustment unit and to output, to the bypass control unit, the read address signal and a write address signal indicative of a first register that stores data indicative of the result of the operation in the operation unit among the plurality of first registers, wherein the bypass control unit includes a first shift register including a plurality of stages for sequentially holding write address signals received from the input unit;

a second shift register including a plurality of stages for sequentially holding read address signals received from the input unit;

a first comparison unit configured to compare the read address signal received from the input unit with the write address signals held in the plurality of respective stages of the first shift register;

a second comparison unit configured to compare the read address signal received from the input unit with the read address signals held in the plurality of respective stages of the second shift register;

a stop signal generation unit configured to generate, based on a comparison result of the first comparison unit and a comparison result of the second comparison unit, a stop signal to stop the operation of the timing adjustment unit; and a bypass selection signal generation unit configured to generate, based on the comparison result of the first comparison unit and the comparison result of the second comparison unit, the bypass selection signal to be output to the second selection unit.

7. The processor core according to claim 1, an input unit configured to output the read address signal to the timing adjustment unit and to output, to the bypass control unit, the read address signal and a write address signal indicative of a first register that stores data indicative of the result of the operation in the operation unit among the plurality of first registers, wherein the bypass control unit includes a first shift register including a plurality of stages for sequentially holding write address signals received from the input unit;

a first comparison unit configured to compare the read address signal received from the input unit with the write address signals held in the plurality of respective stages of the first shift register;

a stop signal generation unit configured to generate, based on a comparison result of the first comparison unit, a stop signal to stop the operation of the timing adjustment unit; and a bypass selection signal generation unit configured to generate, based on the comparison result of the first comparison unit, the bypass selection signal to be output to the second selection unit.

8. The processor core according to claim 1, further comprising:

a fourth register unit configured to hold data output from the operation unit as data indicative of the result of the operation executed by the operation unit and to output the held data to the first register unit and the second selection unit, wherein the second selection unit includes, as the data indicative of the result of the operation executed by the operation unit, each of the data output from the operation unit and the data output from the fourth register unit in the data group.

9. The processor core according to claim 1, wherein the processor core is a single core.

10. A control method of a processor core for out-of-order execution including an operation unit configured to execute an operation, the control method comprising:

holding, by one of a plurality of first registers included in a first register unit included in the processor core, data to be used for the operation in the operation unit;

receiving, by a first selection unit included in the processor core, a read address signal to select data held by a first register, indicated by the read address signal, among the plurality of first registers;

selecting, by a second selection unit included in the processor core and based on a bypass selection signal, data from a data group including the data selected by the first selection unit and data indicative of a result of the operation executed by the operation unit;

holding, by a second register unit included in the processor core, the data selected by the second selection unit to output the held data to the operation unit;

outputting, by a timing adjustment unit included in the processor core, the read address signal to the first selection unit;

sequentially storing, by a storage unit included in the processor core, the read address signal;

generating, by a bypass control unit included in the processor core, the bypass selection signal based on a write address signal of a preceding instruction and a read address signal of a subsequent instruction or a read address signal of a preceding instruction and the read address signal of the subsequent instruction, where the write address signal of the preceding instruction, the read address signal of the subsequent instruction, or the read address signal of the preceding instruction is indicative of a first register in which the data indicative of the result of the operation in the operation unit is to be stored; and when the read address signal of the subsequent instruction matches the read address signal of the preceding instruction, selecting, by the second selection unit, data read by the preceding instruction for the read address signal without instruction retirements based on the bypass selection signal and stopping, by the bypass control unit included in the processor core, an operation of the timing adjustment unit, and wherein when the read address signal of the subsequent instruction matches the write address signal of the preceding instruction, selecting, by the second selection unit, the data indicative of the result of the operation executed by the operation unit without instruction retirements based on the bypass selection signal and stopping, by the bypass control unit, the operation of the timing adjustment unit.

* * * * *